(12) United States Patent
Owen

(10) Patent No.: US 9,651,647 B2
(45) Date of Patent: May 16, 2017

(54) NAVIGATION TRACK CORRECTION

(71) Applicant: Henry S. Owen, Medford, NJ (US)

(72) Inventor: Henry S. Owen, Medford, NJ (US)

(73) Assignee: Henry S. Owen, LLC, Medford, NJ (US)

( * ) Notice: Subject to any disclaimer, the term of this patent is extended or adjusted under 35 U.S.C. 154(b) by 973 days.

(21) Appl. No.: 13/865,826

(22) Filed: Apr. 18, 2013

(65) Prior Publication Data

US 2013/0278466 A1 Oct. 24, 2013

Related U.S. Application Data

(60) Provisional application No. 61/635,058, filed on Apr. 18, 2012, provisional application No. 61/650,521, filed on May 23, 2012, provisional application No. 61/679,056, filed on Aug. 2, 2012, provisional application No. 61/752,960, filed on Jan. 15, 2013, provisional application No. 61/794,426, filed on Mar.

(Continued)

(51) Int. Cl.

| G01S 3/02 | (2006.01) |
|---|---|
| G01S 1/02 | (2010.01) |
| G01S 5/02 | (2010.01) |
| G01S 19/22 | (2010.01) |
| G01S 19/42 | (2010.01) |
| G01S 19/07 | (2010.01) |
| G01S 19/40 | (2010.01) |

(52) U.S. Cl.
CPC ............. *G01S 1/02* (2013.01); *G01S 5/0294* (2013.01); *G01S 19/22* (2013.01); *G01S 5/021* (2013.01); *G01S 5/0252* (2013.01); *G01S 19/07* (2013.01); *G01S 19/40* (2013.01); *G01S 19/428* (2013.01)

(58) Field of Classification Search
CPC ... G01S 3/02; G01S 1/02; G01S 5/021; G01S 5/0252; G01S 5/0294; G01S 19/22; G01S 19/07; G01S 19/40; G01S 19/428
USPC ........................................................ 342/451
See application file for complete search history.

(56) References Cited

U.S. PATENT DOCUMENTS

| 6,518,918 | B1 | 2/2003 | Vannucci et al. |
|---|---|---|---|
| 7,142,586 | B2 * | 11/2006 | Reial .................. H04B 1/7113 375/148 |

(Continued)

FOREIGN PATENT DOCUMENTS

WO 2005002089 A1 1/2005

OTHER PUBLICATIONS

International Preliminary Report on Patentability dated Oct. 30, 2014, issued in corresponding PCT application PCT/US2013/037216, 10 pages.

(Continued)

*Primary Examiner* — Harry Liu
(74) *Attorney, Agent, or Firm* — Snyder, Clark, Lesch & Chung, LLP

(57) ABSTRACT

Methods and systems disclosed herein may include receiving signals along a traveled path over a period of time; recording signal power levels of the received signals over the period of time; receiving a first estimated track of the traveled path; identifying a feature of the received signal power levels, wherein the feature is caused by the signals having traveled different propagation paths; and generating a second estimated track based on the feature and the first estimated track.

20 Claims, 13 Drawing Sheets

Related U.S. Application Data 15, 2013, provisional application No. 61/765,509, filed on Feb. 15, 2013.

(56) References Cited

U.S. PATENT DOCUMENTS

| | | | |
|---|---|---|---|
| 7,519,136 B2 * | 4/2009 | Qi | H04W 64/00 375/316 |
| 2002/0075825 A1 | 6/2002 | Hills et al. | |
| 2008/0039114 A1 | 2/2008 | Phatak et al. | |
| 2010/0097269 A1 | 4/2010 | Loidl et al. | |
| 2010/0245115 A1 | 9/2010 | Bhattacharya et al. | |

OTHER PUBLICATIONS

Extended European Search Report dated Oct. 5, 2015, issued in European Application No. 13778857.6-1812, 7 pages.

International Search Report dated Jul. 1, 2013, issued in corresponding PCT application PCT/US2013/037214, 2 pages.

* cited by examiner

NAVIGATION TRACK CORRECTION

RELATED PATENT APPLICATIONS

This non-provisional patent application claims the benefit of U.S. Provisional Patent Application No. 61/635,058, filed Apr. 18, 2012, U.S. Provisional Patent Application No. 61/650,521, filed May 23, 2012, U.S. Provisional Patent Application No. 61/679,056, filed Aug. 2, 2012, U.S. Provisional Patent Application No. 61/752,960, filed Jan. 15, 2013, U.S. Provisional Patent Application No. 61/794,426, filed Mar. 15, 2013, and U.S. Provisional Patent Application No. 61/765,509, filed Feb. 15, 2013, all of which are incorporated herein by reference.

This invention was made with Government support under Contract Number W31P4Q-10-C-0174 awarded by the U.S. Army Contracting Command, CCAM-RD-A. The Government has certain rights in the invention.

BACKGROUND INFORMATION

Vehicles often have navigation devices to aid occupants while traveling. Consumer electronic devices, including smart phones, often have navigation applications to aid the user while traveling. These navigation devices and applications use navigation techniques or systems, such as a global navigation satellite systems (GNSS), to determine location. In a GNSS, for example, the device or application receives signals transmitted by the satellites and determines location from the received signals. In some instances, particularly in urban environments, the location determined by the GNSS may include errors. These errors may be caused by multipath, reflections, shadowing, refraction, diffraction, etc. These errors may be more pronounced in urban environments because of the presence of tall buildings that reflect and block signals from satellites.

DETAILED DESCRIPTION OF THE EMBODIMENTS

The following detailed description refers to the accompanying drawings. The same reference numbers in different drawings may identify the same or similar elements. Also, the following detailed description does not limit the invention.

One issue with navigation applications, devices, and systems is that accuracy may be reduced as a result of errors, noise, etc. For example, the accuracy of a dead reckoning navigation system may be reduced as a result of errors in the direction of travel as measured by a compass. As another example, the accuracy of GNSS positioning systems may be reduced when the signal from the one of the satellites to the GNSS receiver (e.g., the line-of-sight or LOS) is obstructed. In this case, the path from the satellite to the GNSS receiver may be obstructed by a building, reducing the signal power. In urban areas with large buildings, signals may reflect off the buildings creating multiple signals that take different paths to the GNSS receiver. As a result, when the GNSS receiver receives a signal, the propagation path length from the satellite to the mobile receiver may be increased due to reflection or diffraction around buildings. The direct path may no longer dominate, and the resulting estimated position is biased or in error. It is not uncommon in the urban environment to see significant errors in GNSS position estimates, due to multipath effects and building shadowing.

Methods and systems described below correct for the biases or errors (e.g., that result in an urban environment) in an estimated track (or a "first estimated track"). In one embodiment, using the signals received in a navigation unit (e.g., a GNSS receiver), features are observed in the power level or the signal-to-noise ratio (SNR) from one or more transmitters (e.g., a satellite or television broadcast transmitter), as a navigation unit travels along a path and the navigation unit generates an estimated track. The observed features are compared to expected features along the estimated track. The expected features may be calculated using an electromagnetic wave propagation model. Either a two-dimensional (2D) footprint of nearby buildings, or a three-dimensional (3D) model of nearby buildings, may be used in the propagation model and the calculation of expected features. A corrected track may then be generated based on the comparison of the expected features to the observed features. The corrected track may be referred to as a "second estimated track." In one embodiment, the method may be iterative and the corrected track may include a third, fourth, etc., estimated track.

Figure 1A:
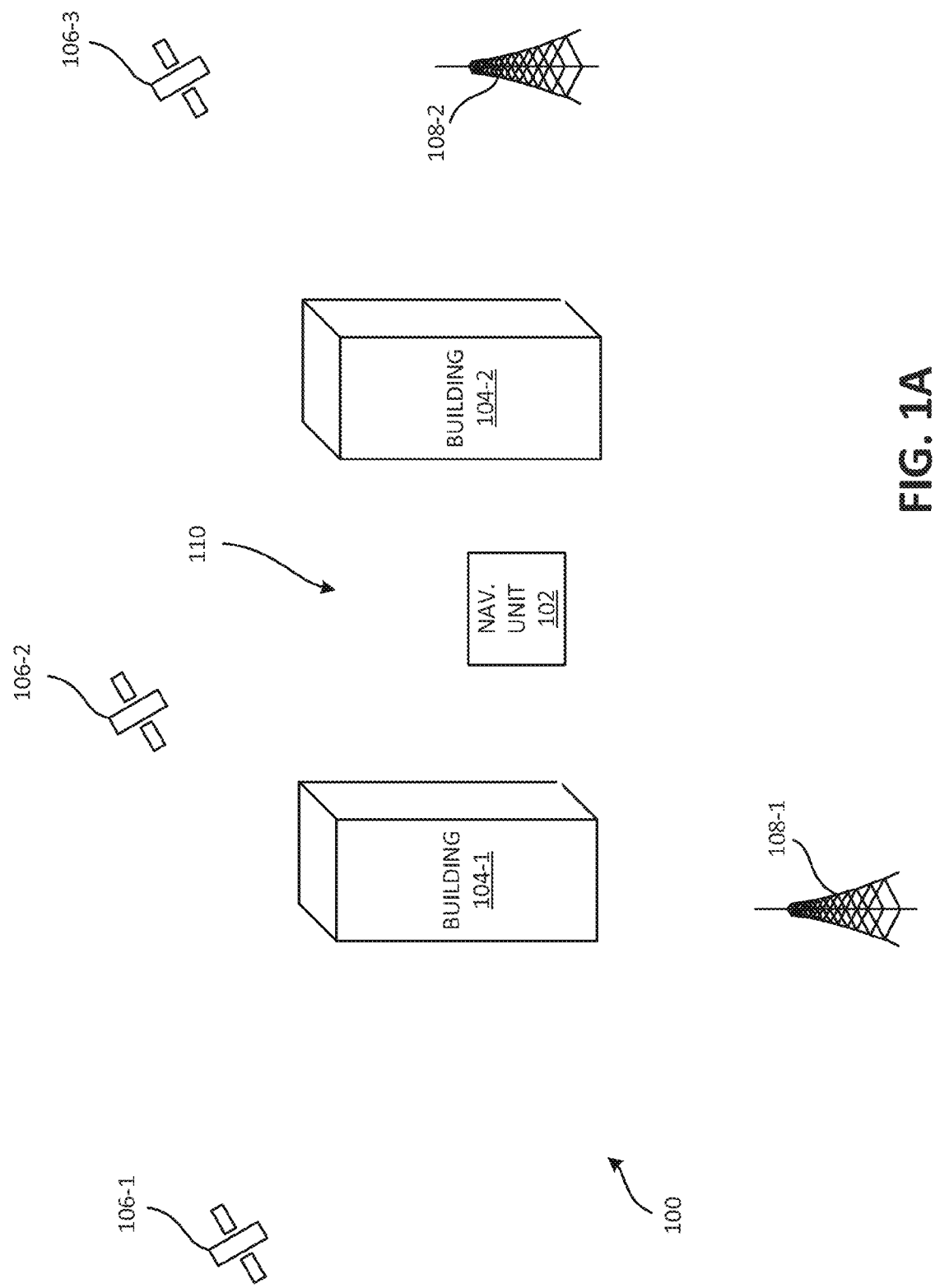
FIG. 1A is a diagram of an exemplary environment for estimating a track of a navigation device and correcting the track.

FIG. 1A depicts an exemplary environment 100 (e.g., an urban environment) for implementing navigation algorithms disclosed herein. Environment 100 includes buildings 104-1 and 104-2 (collectively, "buildings 104"), a navigation unit 102, satellites 106-1 through 106-3 (collectively, "satellites 106"), and transmitters 108-1 and 108-2 (collectively, "transmitters 108").

Satellites 106 may form part of a GNSS that permits navigation unit 102 to determine its position (e.g., on the surface of the earth). Satellites 106 are placed in varying orbits so that at any one time navigation unit 102 may receive signals from a number of satellites. Each satellite 106-x may transmit a coded signal with an accurate time reference to a clock, such as an atomic clock, for example. In one embodiment, navigation unit 102 includes a GNSS receiver and may lock onto signals from multiple transmitting satellites 106. By knowing the positions of satellites 106 and extracting time reference information from the signals, navigation unit 102 can calculate position, for example. The GNSS depicted in FIG. 1A may allow navigation unit 102 to determine its location (longitude, latitude, and altitude). In one embodiment, the GNSS depicted in FIG. 1A may allow navigation unit 102 to determine its location to within a few meters, for example. In other implementations, the GNSS system depicted in FIG. 1A may allow navigation unit 102 to determine its location less accurately or more accurately.

Navigation unit 102 may also determine its position using other methods (e.g., other than or in addition to using satellites). For example, navigation unit 102 may estimate its position using an odometer in a car, an inertial navigation system (e.g., speedometers, magnetometers, accelerometers, compasses, gyroscopes, etc.), dead reckoning, radio direction finding (e.g., Long Range Navigation or "LORAN"), radar, etc. Thus, in one embodiment, environment 100 may not include satellites 106 at all. Navigation unit 102 may estimate its location at a given point in time. Given multiple locations over a period of time, navigation unit 102 may estimate a track that it has traveled. Navigation unit 102 may use any technique to determine position and an estimated track.

In one embodiment, the signals received by navigation unit 102 from satellites 106 are not used to determine the first estimated track, but may be used to determine the corrected track. For example, satellites 106 may broadcast satellite TV stations. In this embodiment, navigation unit 102 may determine its location and the first estimated track using a navigation system or technique other than GNSS. In another example, satellites 106 may include satellites that form a GNSS different than the GNSS used to generate the first estimated track.

Navigation unit 102 may include a mobile phone, a tablet computer, a laptop, a personal digital assistant (PDA), or another portable communication device. In one embodiment, navigation unit 102 may include a dedicated navigation unit that does not include the additional features of a phone, laptop, etc.

Transmitters 108 may include any type of transmitter that transmits a signal that is received by navigation unit 102. Transmitter 108 may include terrestrial broadcast antennas that have a fixed location and transmit television signals using the Advanced Television System Committee (ATSC) standard. Transmitter 108 may include terrestrial mobile telephone cell towers, radio towers, etc. In one embodiment, the location of transmitters 108 is known (to some degree) with respect to time. Transmitters 108 may be fixed with time (such as a TV broadcast tower) or may move with time (such as a satellite).

In the example of FIG. 1A, buildings 104 create a canyon 110 that may shadow navigation unit 102 from satellites 106 from time to time, depending on the location of navigation unit 102 relative to each satellite 106-x. Buildings 104 may also shadow navigation unit 102 from transmitters 108 from time to time, depending on the location of navigation unit 102 relative to transmitters 108. As discussed above, when one of buildings 104 intersects the line of sight from satellite 106-x to navigation unit 102, the power level of the signal received by navigation unit 102 from satellite 106-x may be diminished. Likewise, when one of buildings 104 intersects the line of sight from antenna 108-x to navigation unit 102, the power of the signal received by navigation unit 102 may be diminished.

Figure 1B:
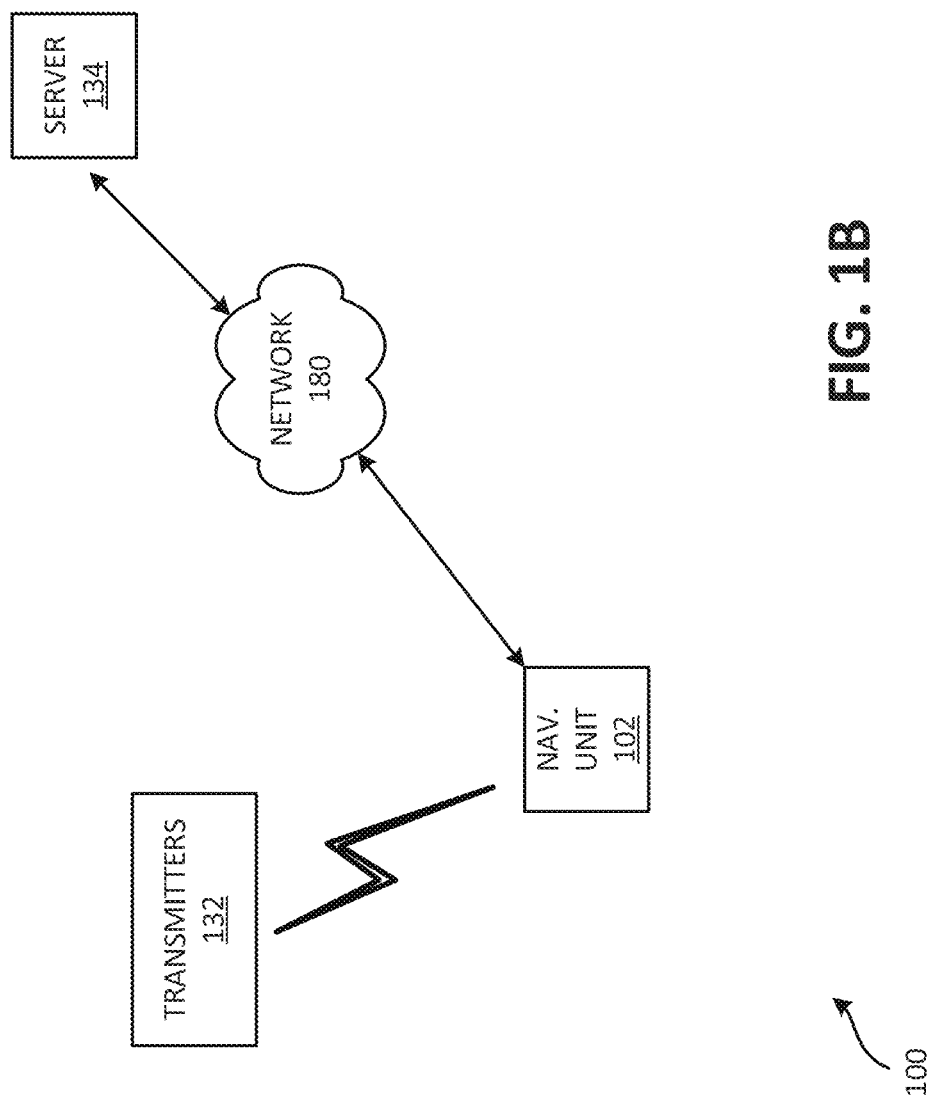
FIG. 1B is a diagram of an exemplary network including the navigation device of FIG. 1A.

FIG. 1B is a block diagram of an exemplary environment 100 depicting additional devices other than navigation unit 102 shown in FIG. 1A. In addition to navigation unit 102, environment 100 may include transmitters 132, a server 134, and a network 180. Transmitters 132 may include satellites 106 (e.g., GNSS satellites), transmitters 108 (e.g., terrestrial broadcast antenna), and/or other transmitters. Navigation unit 102 may receive signals from transmitters 132 to estimate the location of navigation unit 102, determine an estimated track, and/or correct the estimated location or track as described below.

Server 134 may provide services to navigation unit 102. For example, server 134 may include information (e.g., that may be downloaded by navigation unit 102) about the geometry surrounding navigation unit 102, such as three-dimensional or two-dimensional information about buildings or foliage surrounding navigation unit 102. In one embodiment server 134 may determine or contribute to the determination of the first estimated track and/or the corrected track. Navigation unit 102 may communicate with server 134 to correct location estimations. As another example, in an implementation in which navigation unit 102 is a mobile phone, navigation unit 102 may download and run applications from server 134, such as applications from Apple's App Store, Amazon's Application store for Android or Kindle devices, Google's Play Store for Android devices, Verizon's Application store for Android devices, etc. Navigation unit 102 may also download maps, a mapping application, or a turn-by-turn navigation application from server 134.

Network 180 may include one or more packet switched networks, such as an Internet protocol (IP) based network, a local area network (LAN), a wide area network (WAN), a personal area network (PAN), an intranet, the Internet, a cellular network, a fiber-optic network, or another type of network that is capable of transmitting data. Network 180 may allow devices (e.g., navigation unit 102) to connect to other devices (e.g., server 134) also coupled to network 180.

In one embodiment (e.g., in which navigation unit 102 is a mobile phone), network 180 may communicate wirelessly with navigation unit 102 using any number of protocols, such as GSM (Global System for Mobile Communications), CDMA (Code-Division Multiple Access), WCDMA (Wideband CDMA), GPRS (General Packet Radio Service), EDGE (Enhanced Data Rates for GSM Evolution), LTE (Long-Term Evolution), Universal Mobile Telecommunications System (UMTS), High-Speed Downlink Packet Access (HSDPA), etc. In one embodiment, navigation unit 102 may communicate with other devices using wireless network standards such as WiFi (e.g., IEEE 802.11x) or WiMAX (e.g., IEEE 802.16x).

Devices in environment 100 may be networked together such that, for example, any one device may receive signals and/or messages from any other device. Further devices in environment 100 may be networked together such that, for example, any one device may transmit signals and/or messages to any other device. In one implementation, navigation unit 102 may receive signals from transmitters 132 without necessarily transmitting signals to transmitters 132.

The exemplary configuration of devices in environment 100 of FIGS. 1A and 1B is illustrated for simplicity. Environment 100 may include more devices, fewer devices, or a different configuration of devices than illustrated. For example, environment 100 may include thousands or millions of navigation devices and/or servers. In some embodiments, the functions performed by two or more devices may be performed by any one device. Likewise, in some embodiments, the functions performed by any one device may be performed by any other device or multiple devices.

Environment 100 shown in FIG. 1A may include more objects, fewer objects, or different objects than illustrated. For example, environment 100 may include objects other than buildings 104 that interfere with the propagation of signals (e.g., trees, mountains, etc.). Environment 100 may include additional or fewer buildings 104, additional or fewer transmitters 108, additional or fewer satellites 106, etc. In one embodiment, environment 100 may not include any transmitters 108, satellites 106, and/or buildings 104.

Figure 2A:
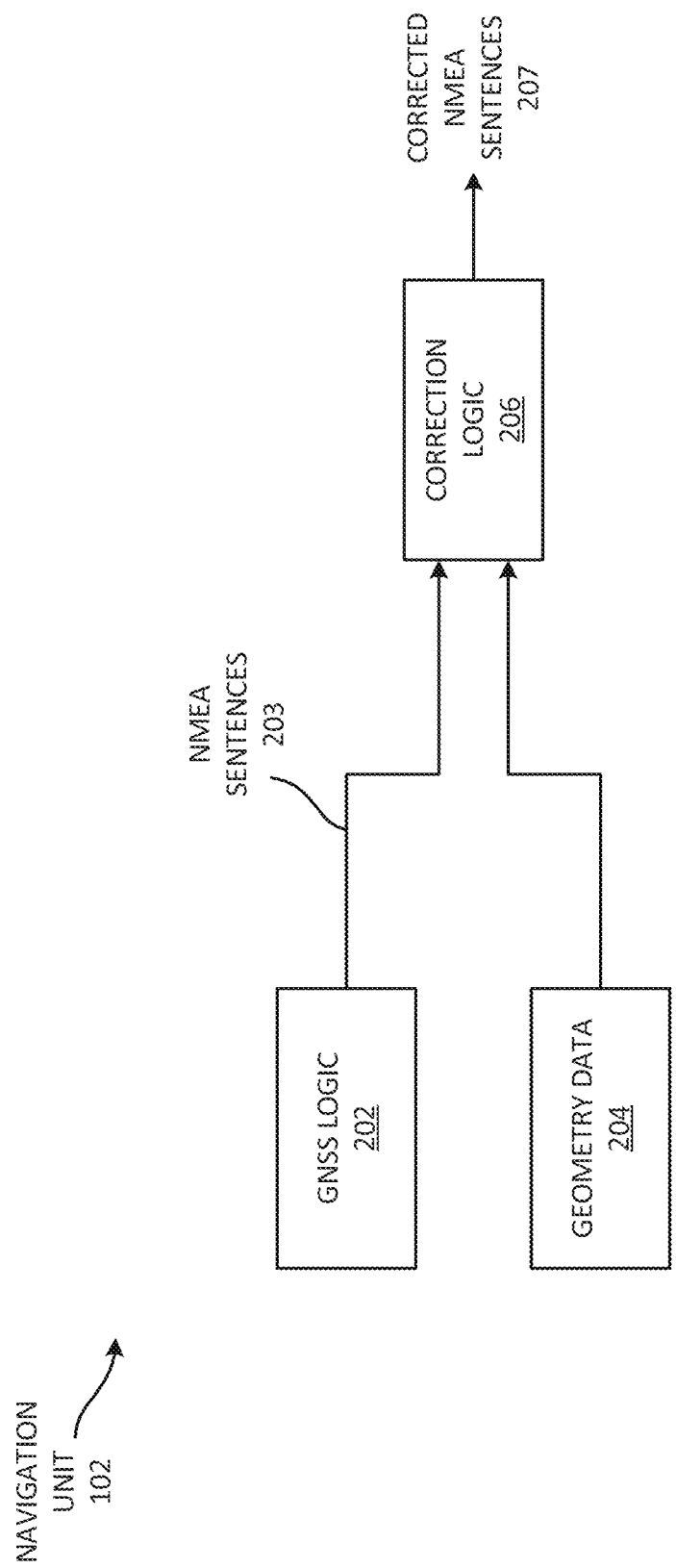
FIGS. 2A and 2B are block diagrams of exemplary components of the navigation unit of FIGS. 1A and 1B.

FIG. 2A is a block diagram of exemplary navigation unit 102 in one embodiment. Navigation unit 102 may include GNSS logic 202, geometry data 204, and correction logic 206. Navigation unit 102 may include additional, fewer, or a different arrangement of components than shown in FIG. 2A.

GNSS logic 202 includes logic that interprets signals received from satellites 106 to derive location information. GNSS logic 202 may include logic that interprets signals from GPS (Global Positioning System) satellites, GLONASS (Globalnaya Navigatsionnaya Sputnikovaya Sistema) satellites, Galileo satellites, BeiDou satellites, or any combination of these satellites or other navigation satellites. In one embodiment, GNSS logic 202 may output location information as NMEA (National Marine Electronics Association) sentences 203 (e.g., NMEA 2000 sentences). NMEA is a standard protocol for relaying data that can include location information and/or information for deriving location, for example. In one embodiment, NMEA sentences 203 may include the estimated location and/or track of navigation unit 102.

Geometry data 204 may include 2D information (e.g., footprint information) or 3D information (e.g., 3D models) about buildings and the location of the buildings. For example, geometry data 204 may include the location of a building 104-*x* and the corresponding footprint of the building 104-*x*. Geometry data 204 may include the location of a building 104-*x* with a 3D model of buildings 104-*x*. Geometry data 204 may include information from Google Earth, for example. Geometry data 204 may be stored in the Keyhole Markup Language (KML) data format. In one embodiment, geometry data 204 also includes information about the characteristics of other obstructions (e.g., mountains, trees, etc.) that may obstruct the signals (e.g., obstruct the line of sight from) transmitter 132 to navigation unit 102.

Correction logic 206 may input NMEA sentences 203 and geometry data 204 and, in one embodiment, output corrected NMEA sentences 207. Corrected NMEA sentences 207 may include location information or information from which location can be derived. Corrected NMEA sentences 207 may provide more accurate information than NMEA sentences 203, for example. In one embodiment, corrected NMEA sentences 207 may include the corrected location and/or track of navigation unit 102. Correction logic 206 is described in more detail below with respect to FIG. 3.

In one embodiment, correction logic 206 may include or use an electromagnetic wave propagation model or simulation tool. Using the propagation model, correction logic 206 may generate expected features given the 2D footprint of objects (e.g., nearby buildings) or 3D model of objects (e.g., nearby buildings). To reduce computation and model complexity, the propagation model may assume optical frequencies (e.g., that light does not diffract or includes little diffraction) when generating expected features. Alternatively, the propagation model may consider diffraction (e.g., given the frequencies of the signals of opportunity) when generating the expected features. In one embodiment, the propagation model may first determine expected features based on optical frequencies (e.g., without diffraction) and then adjust the determined expected features based on radio frequencies (e.g., with diffraction). In one embodiment, the 3D building model of objects (e.g., nearby buildings) may be generated (e.g., by correction logic 206) from 2D footprint information.

Figure 2B:
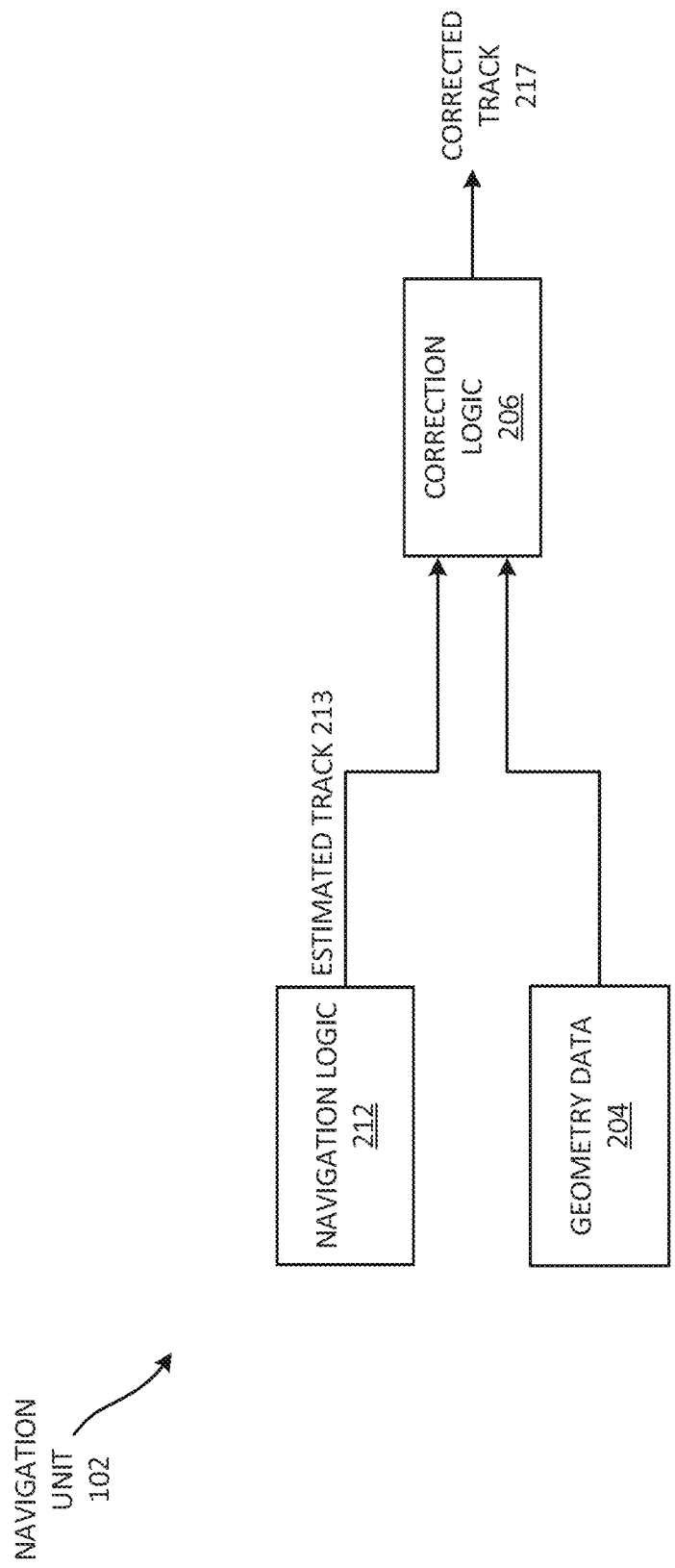

FIG. 2B is a block diagram of exemplary navigation unit 102 in another embodiment. Navigation unit 102 may include navigation logic 212, geometry data 204, and correction logic 206. Navigation unit 102 shown in FIG. 2B is a more generalized version of unit 102 than shown in FIG. 2A. Navigation unit 102 may include additional, fewer, or a different arrangement of components than shown in FIG. 2B.

Geometry data 204 includes the same information described above with respect to FIG. 2A. Navigation logic 212 may include GNSS logic (e.g., GNSS logic 202 described with respect to FIG. 2A) or other logic to determine location of navigation unit 102. Navigation logic 212 may estimate its position or track using an odometer in a car, an inertial navigation system (e.g., speedometers, magnetometers, accelerometers, compasses, gyroscopes, etc.), dead reckoning, radio direction finding (e.g., Long Range Navigation or "LORAN"), radar, etc. Navigation logic 212 may include any logic that determines location and/or track of navigation unit 102. As shown in FIG. 2B, navigation logic 212 may output estimated track 213 (e.g., a series of points and corresponding times) to correction logic 206.

In the case of FIG. 2B, correction logic 206 inputs estimated track 213 and geometry data 204, and outputs corrected track 217. Corrected track 217 may be more accurate than estimated track 213. Correction logic 206 is described below in more detail with respect to FIG. 3.

Figure 2C:
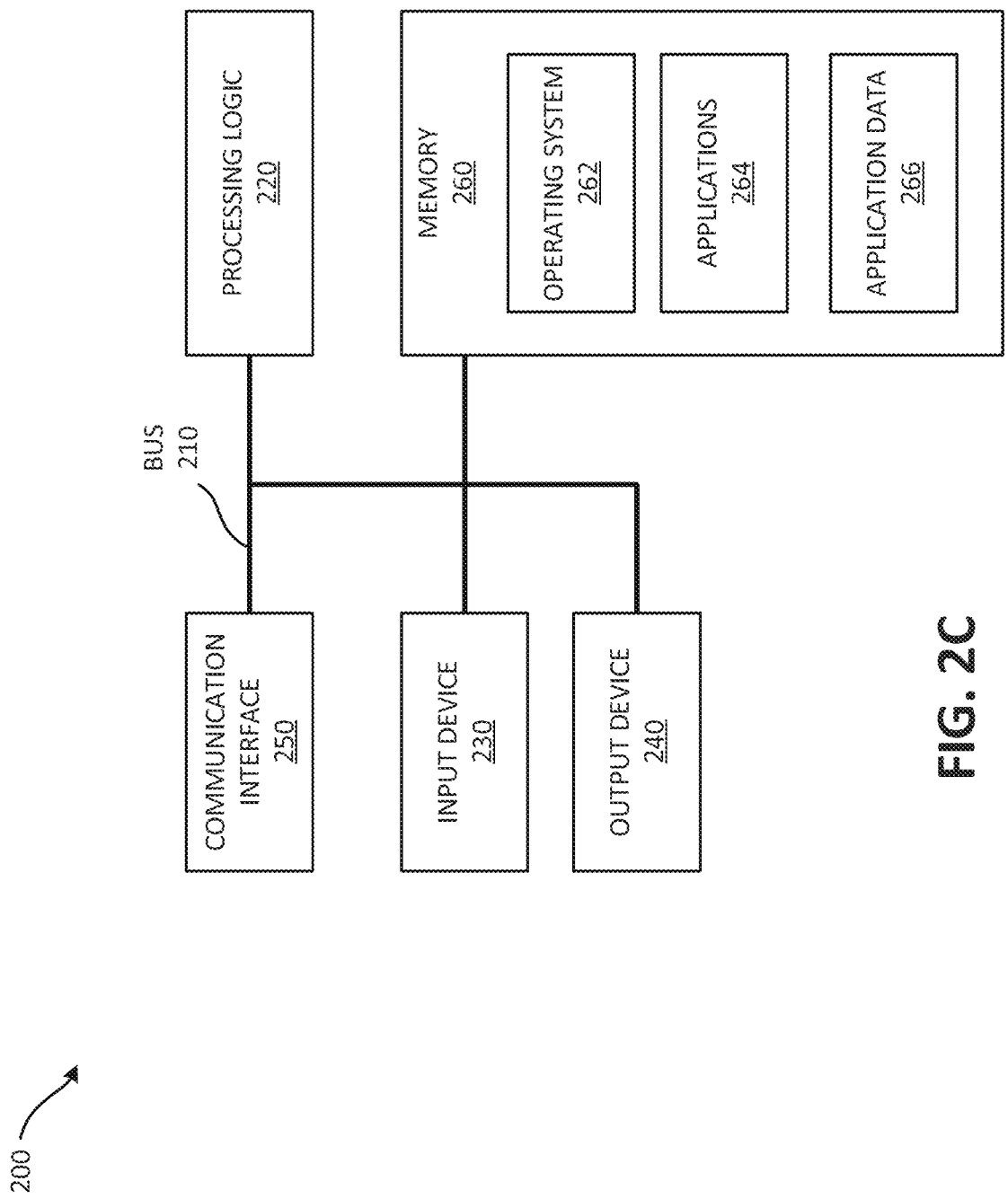
FIG. 2C is a block diagram of exemplary components of a computing module that may be included in the devices shown FIGS. 1A and 1B.

Devices in environment 100 of FIG. 1B (e.g., navigation device 102, server 134, etc), may each include one or more computing modules. FIG. 2C is a block diagram of exemplary components in a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 includes a path that permits communication among the components of computing module 200. Processing logic 220 may include any type of processor or microprocessor (or families of processors, microprocessors, or signal processors) that interprets and executes instructions. In other embodiments, processing logic 220 may include an application-specific integrated circuit (ASIC), a field-programmable gate array (FPGA), etc.

Communication interface 250 may include a transmitter and/or receiver (e.g., a transceiver) that enables computing module 200 to communicate with other devices or systems. Communication interface 250 may include a transmitter that converts baseband signals (e.g., nonmodulated signals) to radio frequency (RF) signals or a receiver that converts RF signals to baseband signals. Communication interface 250 may be coupled to one or more antennas for transmitting and receiving electromagnetic (e.g., RF) signals. Communication interface 250 may include phase shifters or time delays for modulating received signals.

Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth wireless interface, a radio-frequency identification (RFID) interface, a near-field communications (NFC) wireless interface, etc. Communication interface 250 may be particularly adapted to receive signals from transmitters 108, satellites 106 (e.g., GNSS satellites), or other transmitters (e.g., cell towers, radio towers, etc.) Communication interface 250 may allow communication using standards, such as GSM, CDMA (e.g., CDMA 2000), WCDMA, GPRS, EDGE, LTE, UMTS, HSDPA, WiFi, or WiMAX.

Memory 260 may store, among other things, information and instructions (e.g., applications 264 and operating system 262) and data (e.g., application data 266) for use by processing logic 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 262 may include software instructions for managing hardware and software resources of computing module 200. For example, operating system 262 may include GNU/Linux, Windows, OS X, Android, iOS, an embedded operating system, etc. Applications 264 and application data 266 may provide network services or include applications, depending on the device in which the particular computing module 200 is found.

Input device 230 may allow a user to input information into computing module 200. Input device 230 may include a keyboard, a mouse, a microphone, a camera, a touch-screen display, etc. Some devices may not include input device 230. In other words, some devices (e.g., a "headless" device such as server 134) may be remotely managed through communication interface 250 and may not include a keyboard, for example.

Output device 240 may output information to the user. Output device 240 may include a display, a display panel, light-emitting diodes (LEDs) a printer, a speaker, etc. Headless devices, such as server 134, may be autonomous, may be managed remotely, and may not include output device 240 such as a display, for example.

Input device 230 and output device 240 may allow a user to activate and interact with a particular service or application. Input device 230 and output device 240 may allow a user to receive and view a menu of options and select from the menu options. The menu may allow the user to select various functions or services associated with applications executed by computing module 200.

Computing module 200 may include more or fewer components than shown in FIG. 2C. For example, computing module 200 may include a speedometer, a magnetometer, an accelerometer, a compass, a gyroscope, etc. The functions described as performed by any component may be performed by any other component or multiple components. Further, the functions performed by two or more components may be performed by a single component.

Computing module 200 may perform the operations described herein in response to processing logic 220 executing software instructions contained in a tangible, non-transient computer-readable medium, such as memory 260. A computer-readable medium include a physical or logical memory device. The software instructions may be read into memory 260 from another computer-readable medium or from another device via communication interface 250. The software instructions contained in memory 260 may cause processing logic 220 to perform processes that are described herein.

Figure 3:
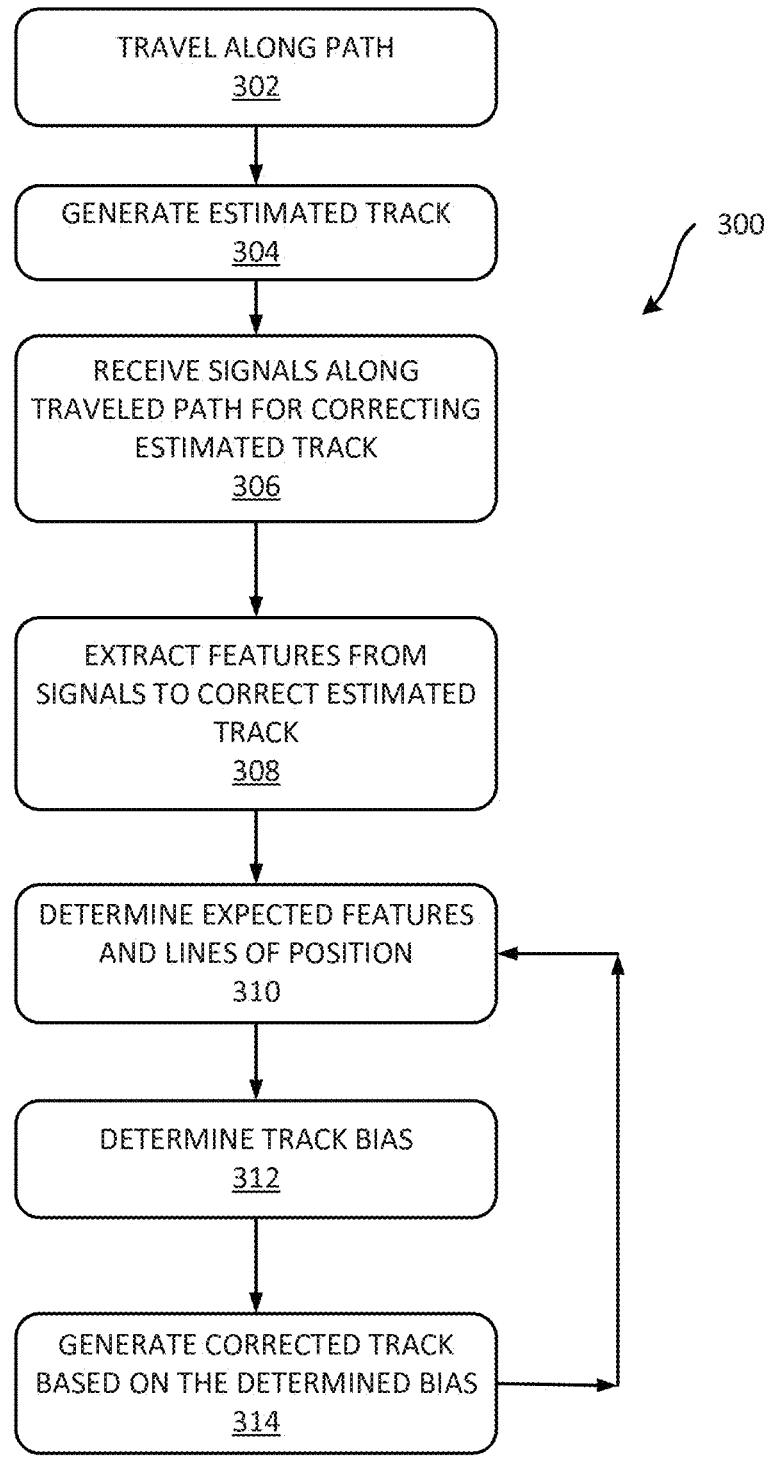
FIG. 3 is a flowchart of an exemplary process for correcting the estimated path of the navigation unit of FIGS. 1A and 1B.

As described above, methods and systems described herein may correct an estimated track to generate a corrected track. FIG. 3 is a flowchart of a process 300 for correcting the estimated track of a navigation device. Process 300 may be executed by navigation unit 102, server 134, and/or other devices. Process 300 is described with respect to FIG. 4A, which illustrates environment 400 (e.g., a simplification of environment 100). Environment 400 includes two buildings 402 (individually "building 402-*x*") and two satellites 406 (individually "satellite 406-*x*"). In the following example, satellites 406 form part of a GNSS and navigation unit 102 includes navigation logic 212 that includes GNSS logic (e.g., GNSS logic 202 shown in FIG. 2A) and described above. Buildings 402 cause multipath reflections, diffraction, and building shadowing, which introduce errors in the estimated track generated by GNSS logic 202.

Figure 4A:
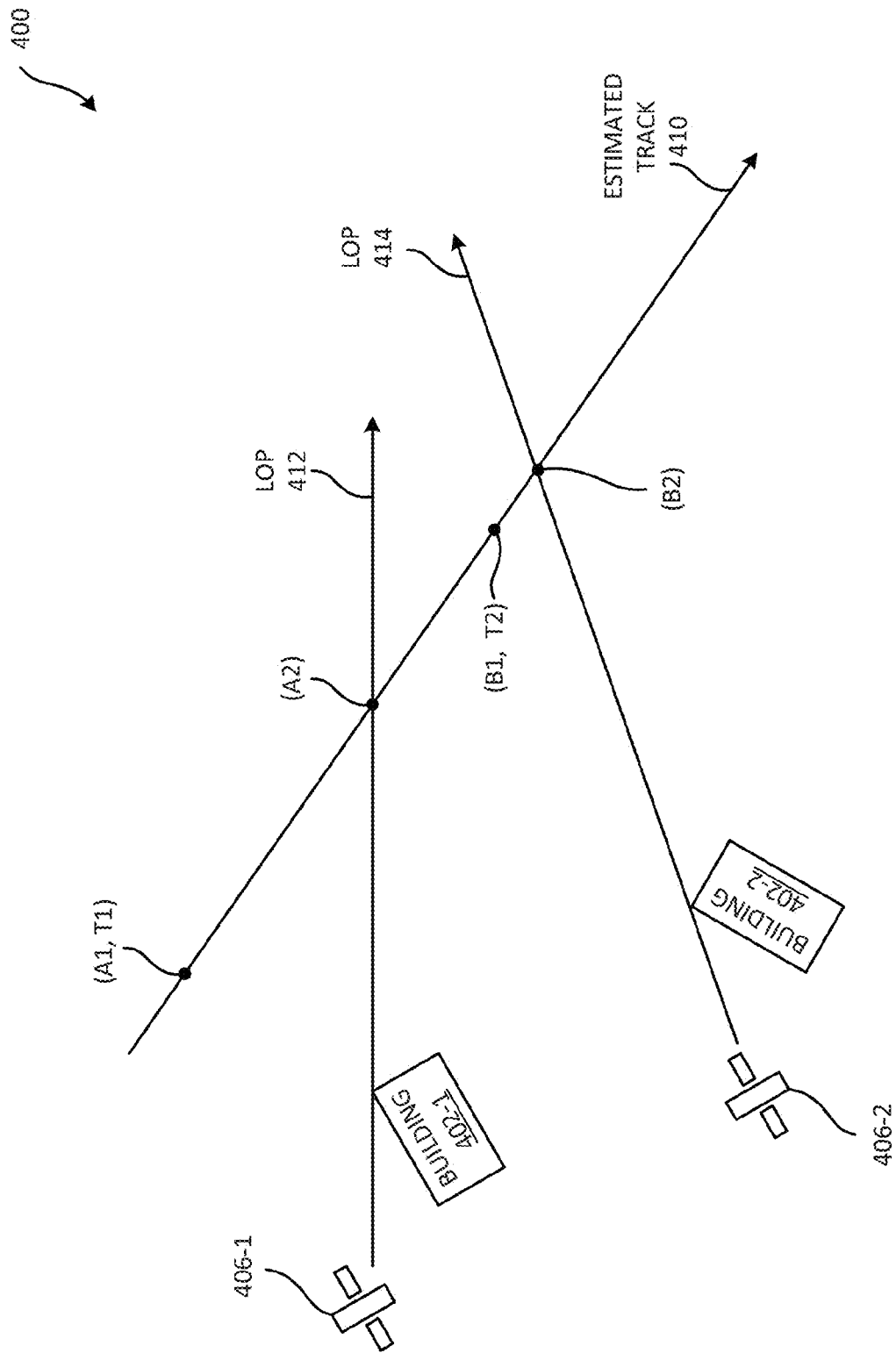
FIGS. 4A and 4B are diagrams illustrating the process of FIG. 3.

Process 300 begins when navigation unit 102 (not shown in FIG. 4A for clarity) travels along a path (block 302). The path traveled by navigation unit 102 is not shown in FIG. 4A because, for example, the traveled path (e.g., the exact traveled path) may not be known. Rather, the path is estimated by navigation unit 102 (e.g., by GNSS logic 202 or navigation logic 212) (block 304) using any navigation estimation technique. In the example of FIG. 4A, as navigation unit 102 travels along the path, navigation logic 212 generates an estimated track 410 (block 304). Estimated track 410, however, includes position errors as compared to the actual traveled path. As discussed above, the position errors may be caused by multipath and diffraction as signals from satellites 406 reflect off and propagate around buildings 402. As shown, estimated track 410 is a line that includes points (e.g., coordinates). Navigation logic 212 may also record the corresponding time for each point along track 410, i.e., the time navigation unit 102 is estimated to be at the corresponding point along estimated track 410. As shown in FIG. 4A, navigation logic 212 estimates that navigation unit 102 is at point A1 at time T1 and at point B1 at time T2. In this example, time T2 is later than time T1 (e.g., it is estimated that navigation unit 102 travels from point A1 to point B1).

As navigation unit 102 travels along its path, it also receives signals (block 306) that are used to correct or fix estimated track 410. In one embodiment, the signals may be the same signals that are used to determine estimated track 410. For example, navigation unit 102 may use the signals received from satellites 406 to correct or fix estimated track 410 as well as to generate estimated track 410 to begin with. In one implementation, navigation unit 102 uses signals received from multiple sources (e.g., multiple satellites 106 and/or transmitters 108) or different sources (e.g., transmitters 108) to correct or fix estimate path 410 than to generate the estimated track 410. In one implementation, the signals used to correct estimated track 410 may originate from one, two, many, most, or all of satellites 106 used in the GNSS. In the following example, however, only signals from satellite 406-1 and 406-2 are used for ease of understanding.

Figure 5:
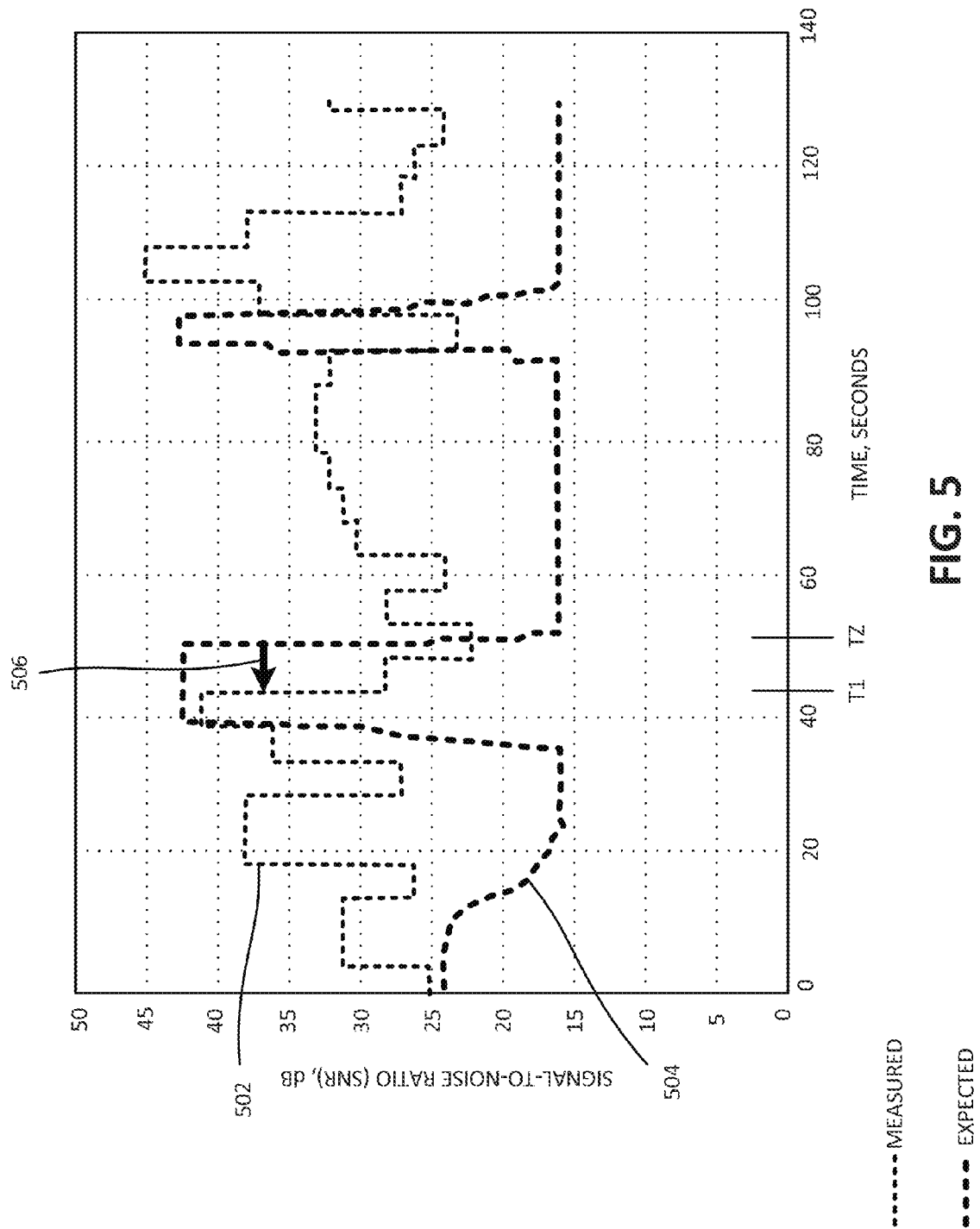
FIG. 5 is a graph of measured signal-to-noise ratios and expected signal-to-noise ratios.

In one embodiment, receiving signals (block 306) to correct the estimated track includes recording the power level of the signals and the corresponding time the power level is observed. Recording the power level of the signal may include recording the signal-to-noise ratio (SNR). FIG. 5 is a graph of a plot of an example of measured SNR over a period of time (light dashed line 502) for the power from satellite 406-1 as seen by navigation unit 102. In the case of navigation unit 102 using navigation logic 212, the signal power may be received by correction logic 206 in NMEA sentence 203, for example. Because the power measurements are associated with an observation time, the power measurements may be associated with a position along estimated track 410.

Features may be extracted from the received signals (block 308). An extracted feature may include, for example, a change in the signal power (e.g., SNR) of a satellite signal (e.g., an increase or a decrease). In the current example, as shown in FIG. 5, when navigation unit 102 is estimated to be at point A1 (e.g., at time T1), the power level of the signal from satellite 406-1 dropped (as compared to a previous measurement at time T1-$x$). In this example, the drop in the power level of the signal received from satellite 406-1 is caused by the building 402-1 (e.g., the edge of the building) blocking the signal from satellite 406-1 to navigation unit 102. That is, the signal from satellite 406-1 to navigation unit 102 was direct, unobstructed, or LOS immediately before time T1 and indirect, obstructed, and/or non-LOS immediately after time T1, thus causing the signal power to drop as seen by navigation unit 102. As shown in FIG. 5, the drop in power level of the signal from satellite 406-1 is abrupt, dropping 25 dB in less than 10 seconds.

A feature may be caused when the signal from the satellite 406-1 to navigation unit 102 transitions from traveling to navigation unit 102 from a first path (e.g., direct, LOS, and/or unobstructed) to a second path (e.g., non-LOS, obstructed, or more obstructed). The first path and the second path have different propagation characteristics, such as different attenuation (e.g., caused by an obstruction that affects the power level of the received signal), different type of path (e.g., direct versus reflected), or both (reflected but through material having different attenuation). A building blocking the line-of-sight from satellite 106 to navigation unit 102 is just one example of how a the signal can transition.

Also, when navigation unit 102 is estimated to be at point B1 (e.g., at time T2), the power level of the signal from satellite 406-2 dropped (as compared to a previous measurement at time T2-$x$). In this example, the drop in the power level of the signal received from satellite 406-2 is caused by building 402-2 blocking the signal from satellite 406-2 to navigation unit 102. The power level around time T2 is not shown in FIG. 5 for ease of understanding.

Expected features may be determined along with the corresponding lines of position (block 310). For example, given the geometry data 204 (e.g., 3D model of building 402-1) and the location of satellite 406-1, correction logic 206 may determine (through the modeling of signal propagation) that the drop in signal power (the extracted feature of the signal received from satellite 406-1 at point A1 at time T1), should have occurred at point A2 along estimated track 410 rather than at point A1. In one embodiment, correction logic 206 may construct a line of position (LOP) 412. LOP 412 may be based on (e.g., may be defined by) the location of satellite 406-1 (at time T1), the location of the edge of building 402-1, and/or estimated track 410. In one embodiment, LOP 412 may include a line that intersects the edge of building 402-1, the location of satellite 406-1, and/or estimated track 410 and may be defined in three dimensions (e.g., azimuth and elevation as seen from the intersection of the line with estimated track 410). In another embodiment, LOP 412 may include a projection (e.g., on the surface of the earth) of the line that intersects the edge of building 402-1, the location of satellite 406-1, and/or estimated track 410 and may be defined in two dimensions (e.g., azimuth as seen from the intersection of the line with estimated track 410). Thus, correction logic 206 may base LOP 412 on any combination of the location of satellite 406-1, the location of building 402-1 (e.g., the edge), and/or estimated track 410, for example.

FIG. 5 also includes a plot of an example of expected SNR over a period of time (dark dashed line 504) for the power from satellite 406-1 as seen by navigation unit 102. As shown in FIG. 5, given the estimated track 410, the location of satellite 406-1, and the building information, the expected SNR is shown as a dark dashed line 504. As indicated by arrow 506, the measured feature (a drop in signal power at time T1) occurred earlier than the expected feature (a drop in signal power at time TZ, which is the time that corresponds to point A2 on estimated track 410).

In addition, in this example, given the geometry data 204 (e.g., 3D model of building 402-2) and the location of satellite 406-2, correction logic 206 may determine (through the modeling of signal propagation) that the drop in signal power (the extracted feature of the signal received from satellite 406-2 at point B1 at time T2), should have occurred at point B2 along estimated track 410 rather than at point B1. Correction logic 206 may construct a LOP 414. LOP 414 may be based on (e.g., may be defined by) the location of satellite 406-2 (at time T2), the location of the edge of building 402-2, and/or estimated track 410. In one embodiment, LOP 414 may include a line that intersects the location of satellite 406-2, the location of the edge of building 402-2, and/or estimated track 410 and may be defined in three dimensions (e.g., azimuth and elevation from the perspective of the intersection with track 410). In another embodiment, LOP 414 may include a projection of the line that intersects the location of satellite 406-2, the location of the edge of building 402-2, and/or estimated track 410 and may be defined in two dimensions (e.g., azimuth from the perspective of the intersection with track 410). Thus, correction logic 206 may base LOP 414 on any combination of the location of satellite 406-2, the location of building 402-2 (e.g., the edge), and/or estimated track 410, for example. As described in more detail below, an extracted and an expected feature may include, for example, a change in the power level of a specific, isolated, delayed propagation path from transmitter 108 (e.g., a reflected signal from a satellite).

As indicated above, correction logic 206 may determine that the extracted feature (e.g., drop in signal power) of the signal received from satellite 406-2 should have occurred at a different point by comparing the extracted feature to an expected feature (e.g., "matching" the extracted and expected features). In such an embodiment, a comparison may be made between the received signals and the expected (modeled) signals to determine whether the features observed along a segment (e.g., of track 410) are of a characteristic that is useful to the generation of LOPs (e.g., to determine that an observed feature matches an expected feature). The decision can be made to use a feature for LOP generation, or to ignore the feature. For example, characteristics of the received signal (e.g., dips and bumps of the power level) can be measured and compared to the expected results. In one example, if a rate of rise or fall in the received signal power does not match the expected rate of the raise or fall in the expected signal to some difference threshold, then the feature from the received signal may be discarded. As another example, if the overall amount of rise or fall in the received signal power (e.g., absolute or relative) does not match the amount of rise or fall in the expected signal to some allowable threshold, then the features from this segment may be discarded. As yet another example, if the distance between a rise and a fall of power (e.g., the width of the bump in the case of a signal bump), or if the distance between a fall and a rise of power (e.g., the width of the dip in the case of a signal dip), does not match between the received signal and expected signal to some difference threshold, then the features may be discarded (e.g., considered not useful) for LOP generation.

Figure 4B:
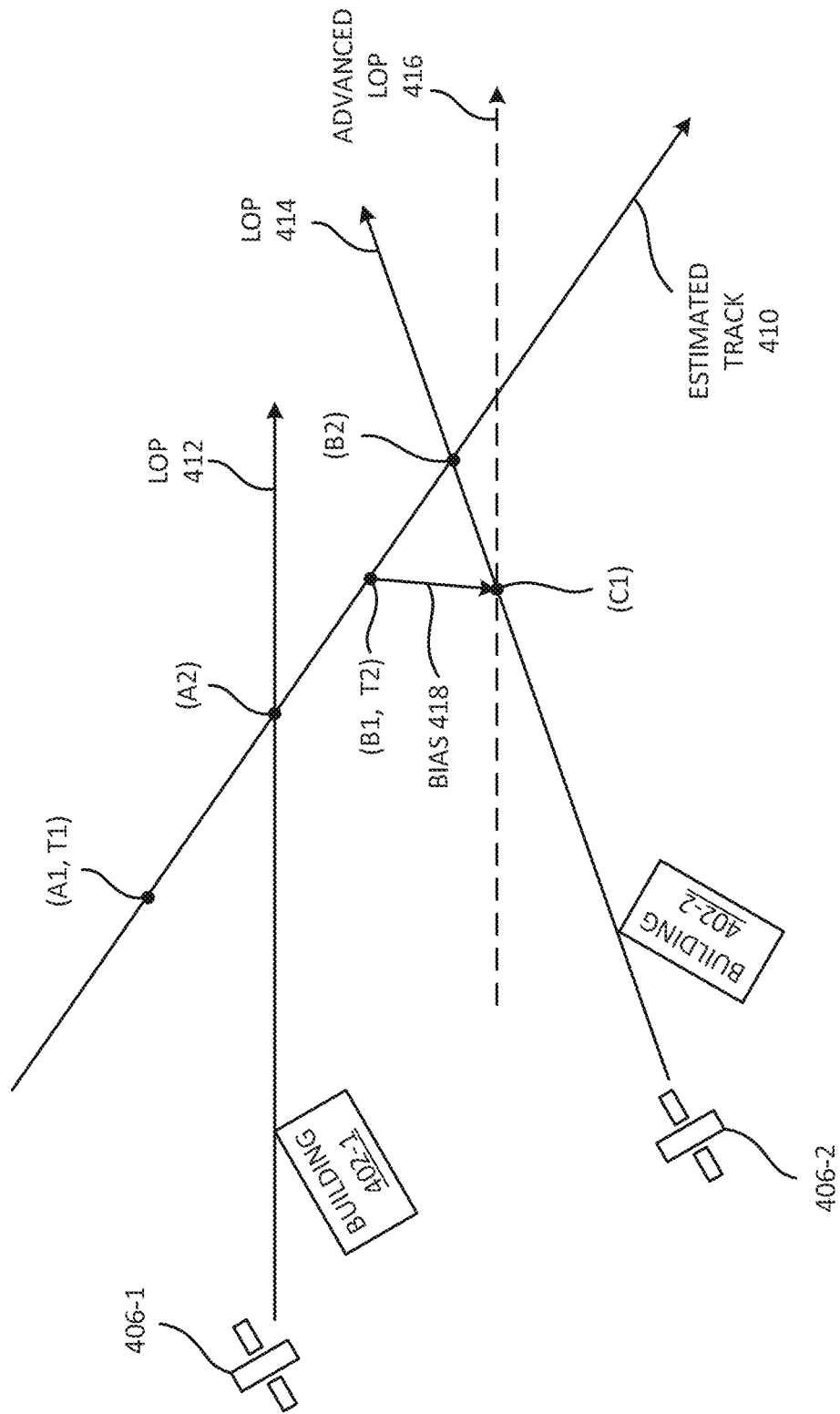

In one embodiment, a track bias is determined based on the expected features and/or the measured, extracted features (block 312). To determine the bias in the current example, LOP 412 may be advanced in time from time T1 to time T2. In other words, LOP 412 may be moved according to a vector defined by point A1 (at time T1) and point B1 (at time T2). In this embodiment, although point A1 and point B1 may have an error introduced by multipath, the relative position between point A1 (at time T1) and point A2 (at time T2) may be considered to be approximately accurate. As shown in FIG. 4B, LOP 412 is advanced to LOP 416. In this case, LOP 414 (from time T2) and LOP 416 (advanced in time to time T2) may intersect at point C1.

Particularly in the case where LOP 414 and LOP 416 are defined in three dimensions, LOP 414 and LOP 416 may not actually intersect at a well defined point. In this case, point C1 may be the point that has the minimum average distance to each LOP. In the case that multiple LOPs are advanced (e.g., in the case where multiple two dimensional LOPs are advanced to a third LOP), the lines may not intersect at a well defined point. Again, in this case, point C1 may be the point that has the minimum average distance or the minimum average squared distance to each LOP. In another embodiment, in the case of two LOPs in three dimensions, point C1 may be the midpoint of the line between the LOPs (e.g., LOP 416 and LOP 414) that has the shortest length. Thus, at time T2, point C1 is considered a more accurate location of navigation unit 102 than point B1. The path bias may then be determined as the vector between point B1 and point C1.

In one embodiment, the advancement of an LOP (e.g., LOP 412 to LOP 416) may be based on information other than (and/or in addition to) the first estimated track. For example, an accelerometer, speedometer, compass, etc., in navigation unit 102 may inform the displacement of the LOP. That is, given a known direction and speed (e.g., without acceleration), the displacement the LOP may be determined. In one embodiment, track 410 is based on information provided from the accelerometer, speedometer, compass, etc in navigation unit 102.

Correction logic 206 may then generate a corrected path by shifting the points in path 410 by bias vector 418. Correction logic 206 may limit this particular correction by bias vector 418 in time and/or space. For example, bias vector 418 may only be considered an accurate representation of the error in track 410 in the immediate vicinity of buildings 402-1 and 402-2. Methods of determining bias regions are described in more detail below. At time T2, points along path 410 may be biased by bias vector 418 back in time until time T1, for example.

Process 300 describes the advancement of one LOP (e.g., LOP 412) to intersect another LOP (e.g., LOP 414). Process 300 may be repeated numerous times by advancing different LOPs (e.g., from other buildings not shown in environment 100) to intersect with a common, reference LOP (e.g., LOP 414). This process may generate numerous bias vectors (e.g., like bias vector 418). In one embodiment, these numerous bias vectors are added and/or weighed to generate a total bias vector that is then used to correct estimated track 410. Some bias vectors, however, may more accurately reflect the errors in the estimated track than other bias vectors. For example, a bias vector generated from a more recent LOP (relative to the reference LOP) may more accurately reflect the error in the estimated track than a bias vector generated from a less recent LOP. A bias vector generated from an LOP closer to the reference LOP may more accurately reflect the error in the estimated track than a bias vector generated from an LOP father from the reference LOP. In one embodiment, bias vectors may first be weighed (e.g., scaled) based on each vector's determined (or perceived) accuracy, before summing the vectors to generate the total bias vector. For example, bias vectors that are similar may be determined or considered to be more accurate than a bias vector that is less similar than others.

As described above, process 300 may be repeated numerous times by advancing different LOPs (e.g., from other buildings not shown in environment 100) to intersect with a common, reference LOP (e.g., LOP 414). Further, a bias vector may be generated that takes into account the numerous LOPs. In one implementation, point C1 may be the point that has the minimum average distance to each LOP or the minimum average squared distance to each LOP. Each LOP may also be weighted (e.g., the distance from point C1 to the LOP may be given a weight) based on the perceived or determined accuracy of the LOP (e.g., based on the age of the LOP).

If a bias vector is formed by a good (e.g., tight) intersection of LOPs, then the bias vector may be considered to have a high confidence level (e.g., perceived or determined to be more accurate). If a bias vector is formed by a poor (e.g., loose) intersection of LOPs, then the bias vector may be considered to have a low confidence level (e.g., perceived or determined to be less accurate). A high confidence level means a low degree of expected error in the corrected position. A low confidence level means a higher degree of expected error in the corrected position. The determination of point C1 may be performed in numerous ways.

As described above, a bias vector (e.g., vector 418) may be combined with one or more other bias vectors (e.g., a bias vector that was determined earlier or with respect to a different reference bias vector). In this case, the one or more other bias vectors may each be weighted based on perceived or determined accuracy of the corresponding bias vector. In one embodiment, one or more of the above techniques can be used to determine a final or total bias vector. For example, multiple LOPs may be advanced to a single reference LOP and/or one or more previous bias vectors may be combined with a current bias vector, etc.

Figure 6:
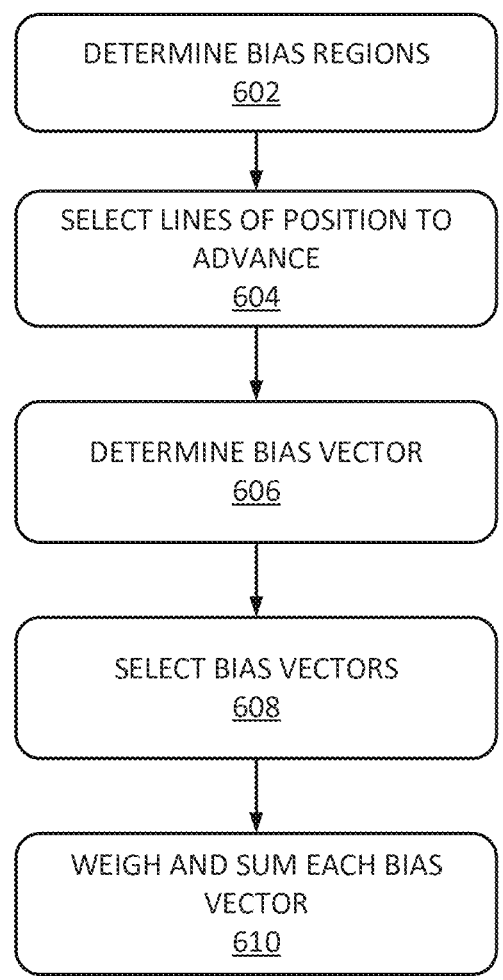
FIG. 6 is a flowchart of an exemplary process to determine bias regions and generate a total bias vector.
Figure 8:
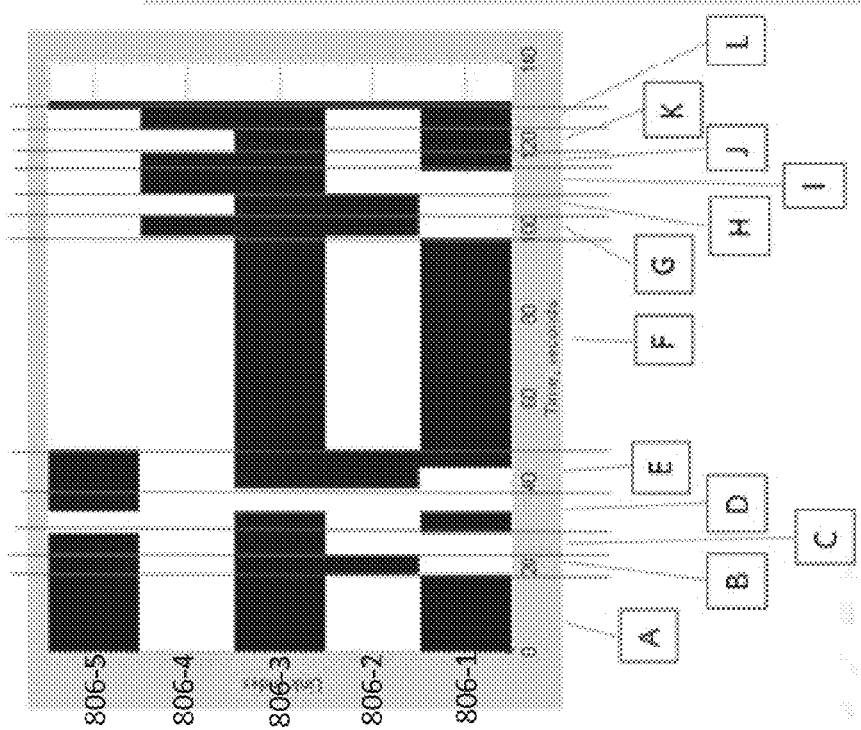
FIG. 8 is a diagram for determining exemplary bias regions.

FIG. 6 is a flowchart of an exemplary process 600 for determining the total bias vector. In one embodiment, "bias regions" may be determined (block 602). A "bias region" includes a portion of an estimated track over which a bias or error (e.g., bias vectors) are expected to be consistent (e.g., more highly correlated). Beyond a bias region, errors associated with a track become less correlated. The size of bias regions may vary along the estimated track. FIG. 8 is a diagram of an exemplary estimated track 802 divided into different bias regions A through L. Bias regions are separated by points and are circled (except for bias region A). As noted above, errors in estimated track 802 are expected to be relatively consistent in a bias region.

Figure 7:
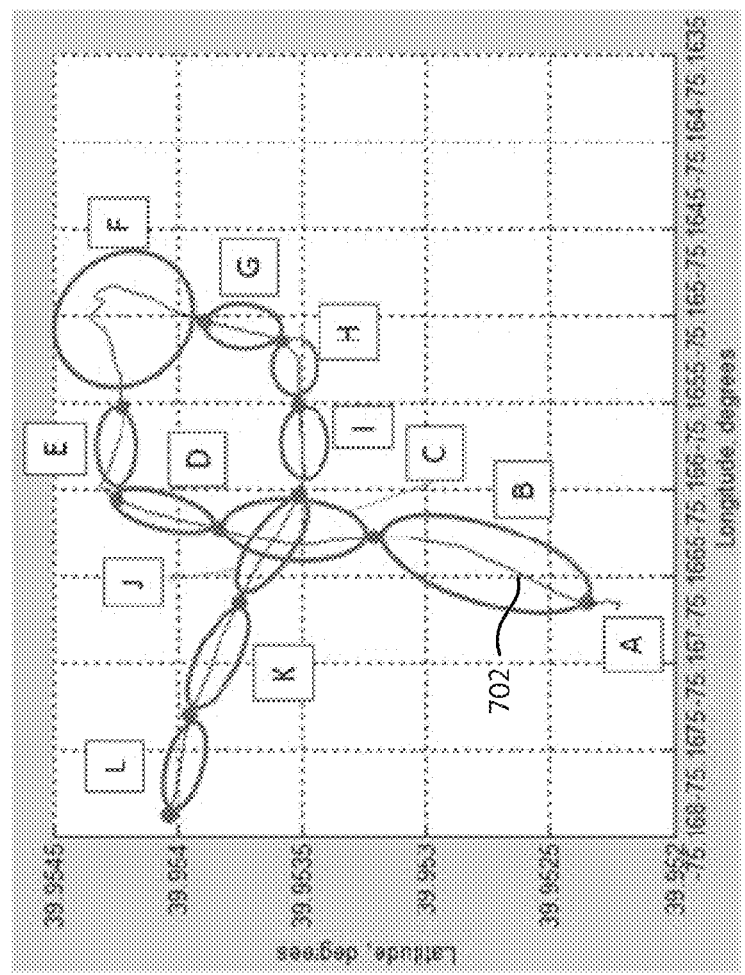
FIG. 7 is a diagram of exemplary bias regions.

A bias region may be determined by calculating a correlation metric that is based on the change in LOS/non-LOS patterns (e.g., non-obstructed LOS/obstructed LOS from satellites 406, for example, to navigation unit 102) over a period of time. For example, FIG. 8 illustrates the LOS/non-LOS patterns between satellites 806-1 through 806-5 and navigation unit 102. The abscissa in FIG. 8 represents elapsed time during a trip. The ordinate represents the status of satellites 806-1 through 806-5: no color indicates that a near-LOS or close to near-LOS condition is determined to exist between the corresponding satellite and navigation unit 102 (e.g., an unobstructed LOS); a dark region indicates that a LOS condition is determined not to exist between the corresponding satellite and navigation unit 102 (e.g., an obstructed LOS). In one embodiment, different bias regions are determined based on the changing patterns. For example, when a certain percentage of conditions change (e.g., two of five), then a boundary of bias regions may be determined. As another example, a boundary between bias region A and bias region B is determined at the point where the status of the link to satellite 806-1 and the status of the link to satellite 806-2 change. The boundary between bias region B and bias region C is determined at the point where the link status to satellite 806-2 changes. FIG. 8 shows the boundaries between bias regions A through L that are shown in FIG. 7.

In other embodiments, the boundary between bias regions may be determined based on time and/or distance. For example, a boundary may be determined after a certain period of time or after a certain distance, or a combination of time and distance.

LOPs are selected to advance to the reference LOP (block 604) for the determination of one or more bias vectors. As mentioned above, multiple LOPs (e.g., LOP 412) may be advanced to determine one or more bias vectors. Which LOPs should be advanced may be determined based on a number of factors. In one embodiment, LOPs in the same bias region as the reference LOP are advanced. In another embodiment, LOPs in a particular number of bias regions surrounding the bias region with the reference LOP are advanced. In yet another embodiment, LOPs in surrounding bias regions are advanced, as long as the surrounding bias region is sufficiently correlated with the current bias region.

In one embodiment, LOPs are selected to advance to the reference LOP based on a time period. For example, LOPs within a certain time period behind the reference LOP may be advanced. In another embodiment, LOPs are selected to advance to the reference LOP based on a distance. For example, LOPs within a certain distance of the reference LOP may be advanced. A bias vector may be determined (block 606) as discussed above (e.g., based on a point that has the shortest distance to all the LOPs, etc). Stated another way, rather than selecting LOPs to advance to the reference LOP, multiple bias vectors may be determined and selected to be summed and/or weighted to determine the total bias (e.g., as described above). In this case, bias vectors may be selected based on the same criteria discussed above for selecting LOPs to advanced, discussed above. If a bias vector is formed by a good (e.g., tight) intersection of LOPs, then the bias vector may be considered to have a high confidence level (e.g., perceived or determined to be more accurate). If a bias vector is formed by a poor (e.g., loose) intersection of LOPs, then the bias vector may be considered to have a low confidence level (e.g., perceived or determined to be less accurate). A high confidence level means a low degree of expected error in the corrected position. A low confidence level means a higher degree of expected error in the corrected position. The determination of point C1 may be performed in numerous ways.

In one embodiment, multiple bias vectors may be selected (block 608). For example, previous bias vectors determined from other reference LOPs may be used to determine a final bias vector. Bias vectors may be selected based on the same criteria used to select LOPs to advance to the reference LOP used to determine the bias vector with respect to block 606. The factors used to select the bias vectors may be similar to the factors used to select the LOPs. For example, bias vectors resulting from reference LOPs that are closer in time may be given greater weight than bias vectors that result from reference LOPs that are not as close in time. Bias vectors resulting from reference LOPs that are closer in distance may be given greater weight than bias vectors that result from reference LOPs that are not as close. In yet another embodiment, bias vectors in the same bias region may be given greater weight than bias vectors in different bias regions.

The bias vectors may be weighed and/or summed (block 608). The selected bias vectors can be weighed and/or summed to generate a total bias vector. As discussed above, the bias vectors may be weighted based on a number of factors. The factors used to weigh the bias vectors may be similar to the factors used to select the LOPs. For example, bias vectors resulting from reference LOPs that are closer in time may be given greater weight than bias vectors that result from reference LOPs that are not as close in time. Bias vectors resulting from reference LOPs that are closer in distance may be given greater weight than bias vectors that result from reference LOPs that are not as close. In yet another embodiment, bias vectors in the same bias region may be given greater weight than bias vectors in different bias regions. Given these various weights for each factor, a total weight for each bias vector is calculated, in one embodiment, by multiplying individual weights together for each individual bias vector. Non-zero total weights, or weights which exceed a minimum threshold, for example, may then normalized. Each weight is then multiplied by its associated bias vector, in one embodiment, and the results are then summed to form a total correction to be applied to an estimated track position.

If the bias vectors are all substantially similar (e.g., the advanced LOPs intersect the reference LOP at approximately the same point), then there is a high level of confidence in those bias vectors. In other words, there is a low degree of expected error in the corrected position. If the bias vectors are not substantially the same (e.g., the advanced LOPs do not intersect the reference LOP at approximately the same point), then there is a low level of confidence in those bias vectors (e.g., a high degree of expected error in the corrected position). Further, if two LOPs are nearly parallel (e.g., so that a slight shift in either LOP results in a large error in the corrected position), then there a low level of confidence in the corrected position. In one embodiment, the degree of confidence (e.g., by the tightness of fit) of a bias vector may be used to determine its weight when combining bias vectors to generate the total bias vector correction.

Figure 9A:
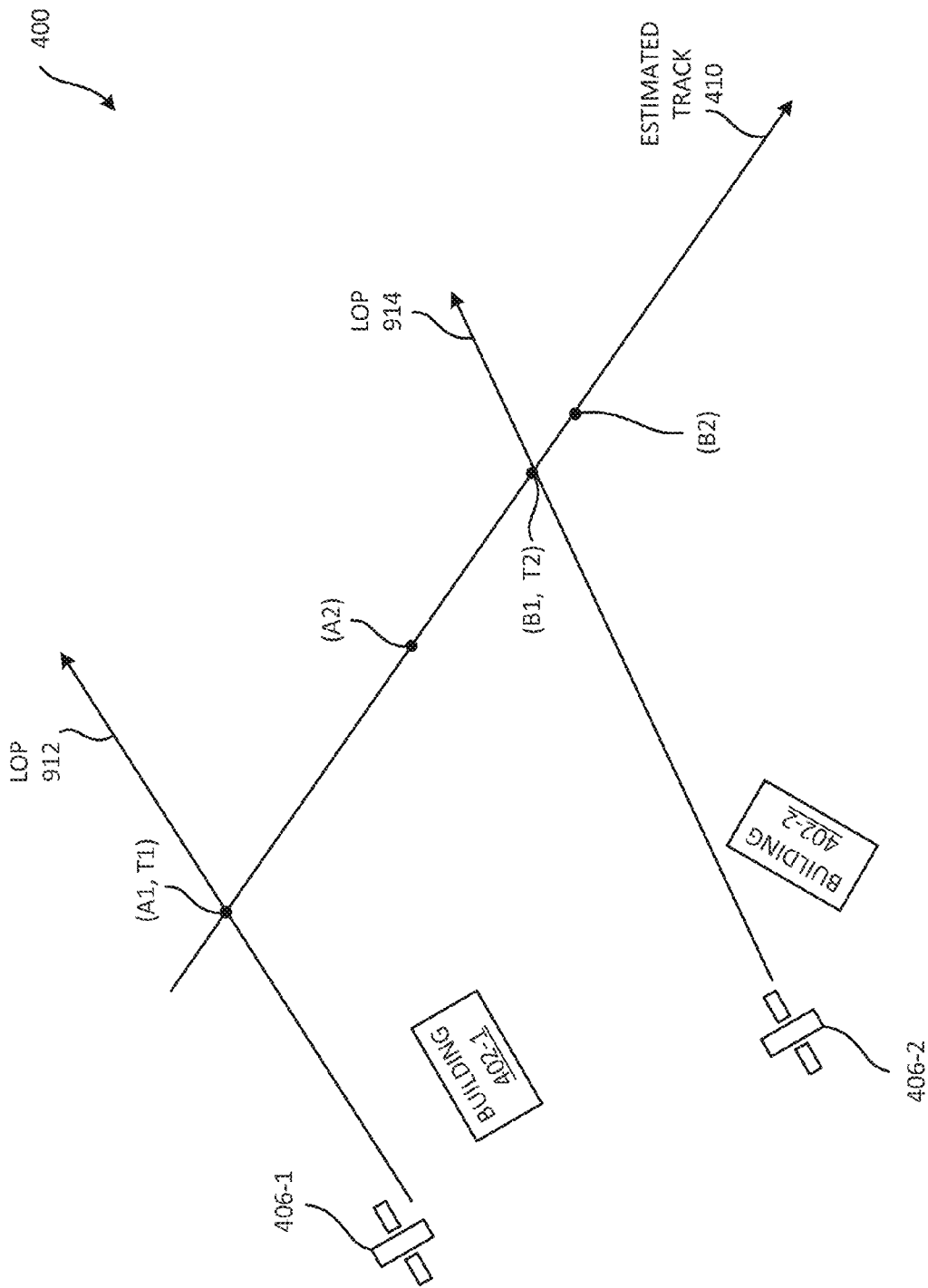
FIGS. 9A and 9B are diagrams illustrating an alternative implementation of the process of FIG. 3.
Figure 9B:
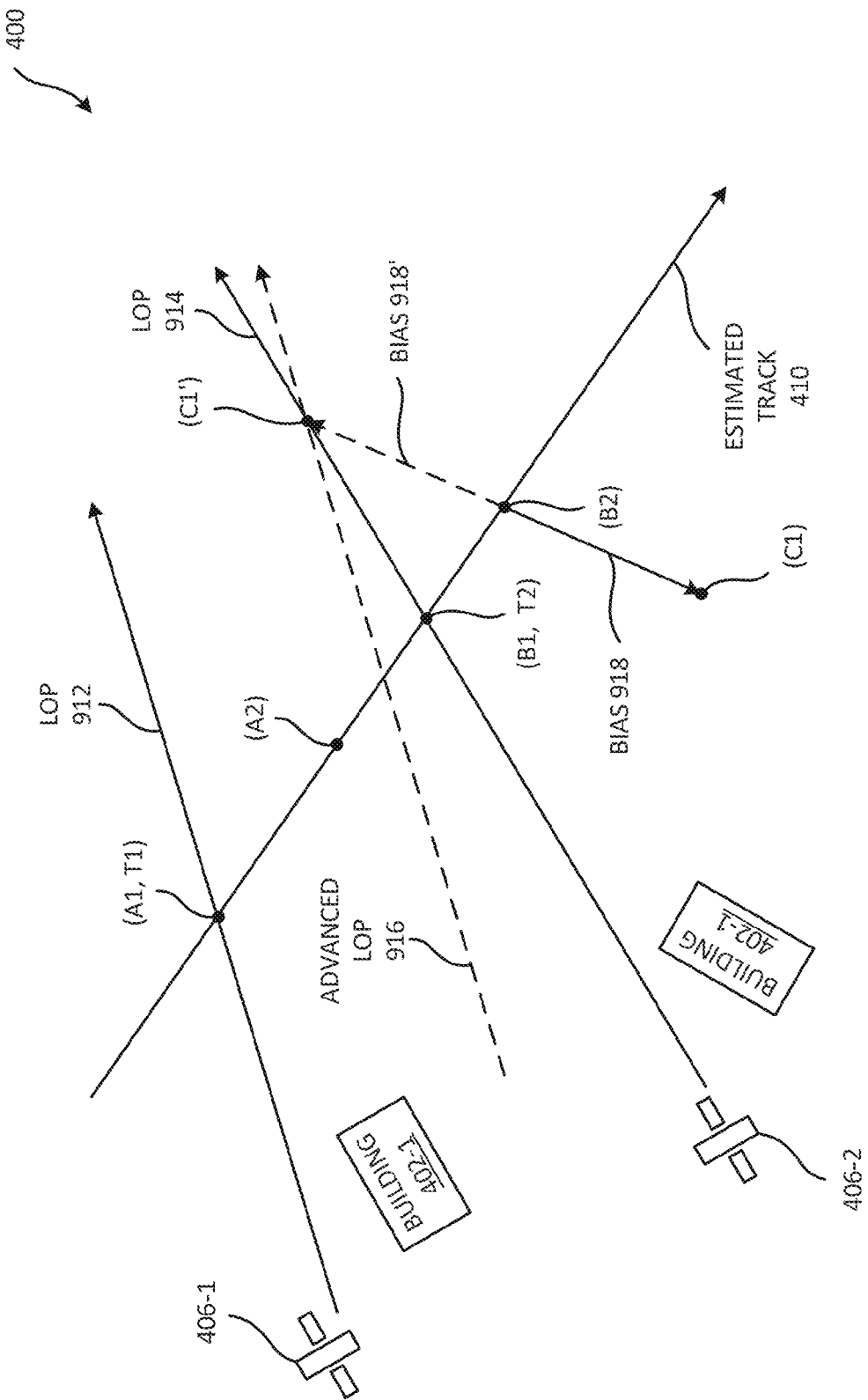

FIGS. 4A and 4B describe one method to advance LOPs to determine a bias vector according to process 300. FIGS. 9A and 9B describe an additional way of implementing process 300 to advance LOPs to determine a bias vector. FIGS. 9A and 9B depict the same environment 400 as described in FIGS. 4A and 4B. FIG. 9A shows estimated track 410, including a point A1 estimated for time T1 and a point B1 estimated for time T2. In this implementation, a LOP 912 is determined from the location of satellite 406-1 to estimated point A1 (block 310). Another LOP 914 is determined from the location of satellite 406-2 to estimated point B1.

As described above, expected features are determined along the estimated path (block 310). For example, point A2 is determined as well as point B2. As shown in FIG. 9B, LOP 912 is advanced according to the relative locations of point A2 and B2. That is, it may be assumed that between time T1 and T2, the relative position of navigation unit 102 (defined by point A2 and point B2) may be assumed to be accurate, even if the absolute position is not considered accurate. In other words, it may be assumed that between time T1 and T2, the relative position of the expected feature positions (defined by point A2 and point B2) as determined by the propagation model may be assumed to be accurate. In this case, as shown in FIG. 9B, advanced LOP 916 intersects LOP 914 at point C1'. A bias vector 918' is determined between point B2 and C1'. In this case, however, bias vector 918' is in the opposite direction as needed to correct the error in point B2. Reversing bias vector 918' while maintaining one end point at point B2 determines point C1, which is the corrected point. As discussed above, points along estimated track 410 may be adjusted according to bias vector 918. As also discussed above, additional LOPs may be advanced and summed to generate a more accurate total bias vector.

In the examples above (e.g., FIGS. 4A, 4B, 9A, and 9B), navigation unit 102 travels along a path. In addition, the method may estimate a corrected position of navigation unit 102 (e.g., when stationary) over time as the transmitters (e.g., satellites 106) move. In this case, the LOPs of 4A, 4B, 9A and 9B can be generated as satellite 106-*x* moves (e.g., in an arc) so that a feature either appears or disappears (e.g., based on the propagation model using diffraction of LOS modeling) to navigation unit 102 (e.g., navigation unit 102 may be stationary). In this case, the algorithm operates as described, but advancement may be omitted for the LOPs as the receiver may be considered stationary for the period of time of interest.

In another embodiment, the process can be repeated several times to iteratively correct the track. The process can be completed, and then the updated positions (updated track) can be used as a new 'estimated' track. This new estimate can be used as an input to the algorithm, and the same steps can be executed with the same measurements to generate a new set of corrected positions. This can be repeated several times, where the weights and algorithm parameters may or may not be changed in each iterative stage, and where no new observed signal levels are required.

As described above, the presence or absence of a direct-path signal (LOS or with diffraction) is used to determine expected signals and to extract features. In another embodiment, correction logic 206 may use measured and expected signals that are reflected (e.g., off a building) as well as direct-path signals. In this embodiment, features and/or LOPs can be extracted from non-LOS or reflected signals. For example, the signals received along the traveled path (block 306) may include reflected signals (as well as signals that are not reflected). A signal may reflect off a building that is received in navigation unit 102, for example, and the reflected signals may represent a delayed echo in the radio frequency signal. In one embodiment, a signal processor (e.g., a correlator, an equalizer, or other mechanism) may detect or isolate reflected signals. A correlator, for example or other signal processing device, may determine the signal power level at various delay times relative to the direct path signal. An increase or decrease in the power level of such a delayed signal, representing a reflection, for example, can also be used as a feature. Just as with direct-path signals, reflected signals may be obstructed by objects (such as another building between navigation unit 102 and the building that is reflecting the signal). In this case, reflected signals may transition from being present (e.g., a strong signal) to being absent (e.g., a weak signal); or transition from being absent (e.g., a weak signal) to present (e.g., a strong signal). Using geometry data 204, correction logic 206 may determine expected features from expected reflected signals (block 308). Thus, correction logic 206 (e.g., employing process 300) may correct errors in the estimated track by comparing observed power levels of reflected signals (e.g, isolated echos) to expected power levels of reflected signals from a propagation model.

As described above, expected features and/or LOPs may be determined (block 310). In one embodiment as discussed above with respect to FIG. 3, for example, expected features may be determined for a receiver as it travels along estimated track 410, which may be determined by navigation logic 212. In another embodiment, expected features may be determined for navigation unit 102 for multiple variations from the expected track. For example, one type of variation could be an offset from estimated track 410 (or a second estimated track, etc.), but variations can also include other types of differences from estimated track 410. For each variation from the estimated track 410, LOPs, bias vectors, and new estimated tracks, may be calculated as described with respect to FIG. 3. The multiple estimated tracks may be used individually or combined either by averaging, combining LOPs or bias vectors, or combining in some other method. This embodiment may allow for the use of multiple variations of the estimated track 410 (or a second estimated track, etc.) to improve results, but in one embodiment may not require the use of multiple variations of the estimated track 410. Each of the variations of the estimated track are not being evaluated as a 'best fit' for the corrected track, but may provide information that when combined produce a better corrected track. Therefore, in one embodiment, the process may be repeated for multiple variations from the first estimated track, and the resulting LOPs or bias vectors may be combined and/or used individually to produce an updated track.

In one embodiment, expected features may be determined based on one or more extracted feature. For example, expected features may be determined in the vicinity around an expected feature (e.g., based on distance from the expected feature). In one implementation, expected features are only determined based on extracted features, which may relieve correction logic 206 from determining expected features unnecessarily. Further, methods and systems described herein may allow for expected features to be determined along an estimated track (e.g., an estimated track 410 as a line) rather than in a larger volume of space surrounding an estimated track 410, for example, which may also relieve correction logic 206 from determining expected features unnecessarily. Further, fewer expected features may reduce processing as matching expected features with extracted (e.g., measured) features may likewise be reduced. Methods and systems described herein calculate for a geometrical error based on the determination that an expected feature matches an extracted feature.

Methods and systems described above may also correct for the biases or errors in an estimated track that result from an indoor environment. Biases and errors caused by multipath, reflections, etc. may be caused inside a building where signals may be attenuated and/or reflected by structures within the building (or from outside the building), for example.

In one embodiment, methods methods and systems described above may also be employed to update or correct the position of two navigation units 102 working together. In this embodiment, the relative position may be known, and observed and expected signals may be combined from the two navigation units 102. The advancement of one LOP from one navigation unit 102 to be combined with the LOP of another navigation unit 102 may be conducted with estimated or known relative position information of the two navigation units 102. Also, bias vectors from one navigation unit 102 may be combined with bias vectors from another navigation unit 102 to provide an improved result. Therefore, in one embodiment, LOPs and/or bias vectors from multiple navigation units 102 may be combined to provide a single bias vector.

Extracted features can also include other identifiable characteristics of the received signal, and are not limited to sharp increases or decreases in the received power level. In one embodiment, features may include characteristics other than shifts in received power level. For example, features may include changes in the polarization of the signal; changes in other representations of the signal (e.g., in the time domain or the frequency domain) such as those determined by transforms such as the Fourier transform, Fast Fourier Transform, Discrete Cosine Transform, wavelet transform, or another filtering operation; changes in signal level between LOS and non-LOS conditions; changes in signal level entirely in non-LOS conditions; and/or changes in signal level among a specific reflected or diffracted path of the echo profile.

Line-of-sight (LOS) conditions are considered to exist, for example, when the received radio frequency signal is not significantly obstructed or attenuated, and the received signal power level level at a given position is within a few decibels (dB) of the maximum signal power level (e.g., the theoretical power level given normal unobstructed propagation through atmosphere and/or received from the transmitter at other position in the region. All signals in the region can be attenuated by a common entity, such as attenuation from precipitation, but LOS conditions still exist if the signal level at any position of interest has no other significant blockage or attenuation other than this common attenuation for all receivers in the region, and the signal level is within a few dB of the maximum signal level in the region.

In one embodiment, geometry data 204 is not be stored in navigation unit 102 or directly used by correction logic 206. In this embodiment, correction logic 206 may query a database of geometry data (e.g., that stores geometry data 204). The database may return an indication of whether an optical line of sight path is exists or not between navigation unit 102 and the corresponding transmitter. Conversion from optical LOS conditions to radio frequency power levels may be conducted (e.g., by correction logic 206) without direct access to the geometry data (e.g., geometry data 204 that may include 2D or 3D geometry). This embodiment may be particularly useful in the situation where geometry data is proprietary, too extensive to be stored in navigation unit 102. This embodiment may also allow for the shift of some computation to a device other than navigation unit 102 (e.g., to server 134). As described above, some or all of correction logic 206 may be performed by devices other than navigation unit 102 (e.g., by server 134). In one embodiment, some or all of the logic of navigation logic 212 may also be shifted to a device such as server 134. In this embodiment, raw satellite data may be sent to server 134 and first estimated track 213 may be returned to navigation unit 102 for correction logic 206. In another embodiment, correction logic 206 may be in server 134 as well and corrected track 217 may be returned to navigation unit 102 without transmitting estimated track 213 to navigation unit 102.

In one embodiment, data stored in geometry data may be generated using the method and apparatus described in the U.S. patent application Ser. No. 13/865,828, titled "Estimating Characteristics of Objects in Environment," filed the same day herewith, which is incorporated herein by reference in its entirety.

As described herein, in one embodiment, a method may comprise receiving signals along a traveled path over a period of time; recording signal power levels of the received signals over the period of time; receiving a first estimated track of the traveled path; identifying a feature of the received signal power levels, wherein the feature is caused by the signals having traveled different propagation paths; and generating a second estimated track based on the feature and the first estimated track.

The method may further comprise, in one embodiment, associating the recorded signal power levels with the first estimated track based on time; and determining a location on the first estimated track associated with the feature. In the method, the feature of the received signal power levels is an observed feature and the location is an observed location. In one embodiment, the method may further comprise determining expected power levels of the received signals along the first estimated path; and identifying an expected feature of the expected power levels. The method may further comprise determining an expected location on the first estimated track of the expected feature. In one embodiment, generating of the second estimated track may include generating the second estimated track based on the observed location and the expected location. In the method, determining the expected power levels may include modeling propagation of the received signals to the first estimated track.

In one embodiment, modeling propagation may include modeling line-of-sight (LOS) propagation paths, each path having a different attenuation. In one embodiment, the feature of the signal power levels is a decrease of the signal power levels. In one embodiment, the feature of the received signal power levels is an increase of the received signal power levels.

In another embodiment, a method described herein may include receiving signals along a traveled path over a period of time; recording signal power levels of the received signals over the period of time; receiving a first estimated track of the traveled path; identifying an observed feature of the received signal power levels; determining a location on the first estimated track associated with the observed feature; determining expected power levels of the received signals along the first estimated path; identifying an expected feature of the expected power levels; and determining an expected location on the first estimated track of the expected feature; and generating a second estimated track based on the observed location, the expected location, and the first estimated track.

In one embodiment, the method may comprise associating the recorded signal power levels with the first estimated track based on time. In one embodiment, determining the expected power levels includes modeling propagation of the received signals to the first estimated track. In another embodiment, modeling propagation includes modeling LOS propagation and modeling non LOS propagation from the transmitter to the first estimated track. In yet another embodiment, the observed feature of the signal power levels is a decrease of the signal power levels. In another embodiment, the observed feature of the received signal power levels is an increase of the received signal power levels.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While a series of blocks has been described with regard to the processes illustrated and described, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code, it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
receiving signals, in a receiver from a transmitter, along a traveled path, wherein the traveled path is a path actually traveled by the receiver;
storing, in a memory, a first estimated track, wherein the first estimated track includes an estimate of the traveled path of the receiver,
recording, in a memory, signal power levels of the received signals, wherein the signal power levels include a first measured signal power level measured at a first time and a second measured signal power level measured at a second time, wherein the first time is before the second time;
associating, in the memory, the first measured signal level power with the first time and associating the second measured signal power level with the second time;
identifying, by a processor, an extracted change between the first measured signal power level associated with the first time and the second measured signal power level associated with the second time,
wherein the extracted change is caused by a propagation path between the transmitter and the receiver transitioning from an unobstructed propagation path at the first time to an obstructed propagation path at the second time as the receiver moves along the traveled path from the first time to the second time,
associating, in the memory, a first location on the first estimated track with the extracted change;
storing, in the memory, a model including a model of an obstruction and a model of the transmitter;
simulating, by the processor and based on the model, modeled signals from the model of the transmitter to points along the first estimated track to generate expected signal power levels of the modeled signals;
identifying, by the processor, an expected change of the expected signal power levels, wherein the expected change is caused by a modeled propagation path transitioning from a modeled obstructed propagation path to a modeled unobstructed propagation path,
storing, in the memory, an association between a second location on the first estimated track with the expected change;
identifying, by the processor, the expected change as corresponding to the extracted change;
generating a second estimated track, wherein the second estimated track is an estimate of the traveled path, based on the first location on the first estimated track associated with the extracted change and the second location of the first estimated track associated with the expected change; and
storing the second estimated track in the memory, wherein the second estimated track includes smaller positional errors than the first estimated track relative to the traveled path.

2. The method of claim 1, wherein the model of the obstruction includes a two-dimensional model of the obstruction.

3. A method comprising:
receiving signals in a receiver from a transmitter, along a traveled path, wherein the traveled path is a path actually traveled by the receiver;
storing, in a memory, a first estimated track, wherein the first estimated track includes an estimate of the traveled path;
recording, in the memory, signal power levels of the received signals;
identifying, by a processor, an extracted feature of the signal power levels, wherein the extracted feature is caused by a propagation path between the transmitter and the receiver transitioning from a first propagation path to a second propagation path as a result of the receiver having traveled from a first point on the traveled path to a second point on the traveled path, wherein the first point is different than the second point;
generating, by the processor, expected signal power levels of the received signals based on the first estimated track of the traveled path;
generating, by the processor, a second estimated track based on the recorded signal power levels, the expected signal power levels, and the extracted feature; and
storing, in the memory, the second estimated track, wherein the second estimated track is more accurate than the first estimated track relative to the traveled path.

4. The method of claim 3,
wherein receiving the signals along the traveled path includes receiving the signals over a period of time,
wherein recording signal power levels of the received signals includes recording the signal power levels of the received signals over the period of time, and
wherein the extracted feature is caused by the signals having traveled different propagation paths to two different points on the traveled path at two different times.

5. The method of claim 4, further comprising:
identifying an expected feature based on the expected signal power levels;
determining a track bias based the extracted feature and the expected feature; and
generating the second estimated track based on the track bias.

6. The method of claim 5, further comprising
identifying extracted features of the signal power levels, wherein the extracted features are caused by the signals having traveled different propagation paths to the traveled path;

identifying expected features based on the expected signal power levels, wherein determining the track bias includes determining the track bias based the extracted features and the expected features; and
generating the second estimated track based on the track bias.

7. The method of claim 6,
wherein each of the extracted features is caused by the signals having traveled different propagation paths from a same transmitter to the traveled path; and
wherein determining the track bias comprises determining the expected features that correspond to the extracted features.

8. The method of claim 7, further comprising:
determining lines of position (LOPs) based on the expected features or based on the extracted features;
advancing one or more of the LOPs based on locations associated with each of the extracted features; and
determining the track bias based on the LOPs.

9. The method of claim 8, further comprising:
determining the track bias based on an intersection of two of the LOPs, or,
determining the track bias based on an intersection of three or more of the LOPs and determining a confidence level of the track bias based on a distance between intersections of different pairs of the three or more of the LOPs.

10. The method of claim 6, wherein identifying an extracted feature of the signal power levels further comprises:
detecting an increase in the signal power levels indicating shifts in the propagation paths of the signals, wherein the increase in the signal power levels is indicative of an obstruction of one of the propagation paths relative to another one of the propagation paths, or
detecting a decrease in the signal power levels indicating shifts in the propagation paths of the signals, wherein the decrease in the signal power levels is indicative of an obstruction of one of the propagation paths relative to another one of the propagation paths.

11. The method of claim 10, wherein further comprising:
recording polarity of the received signals; and
identifying an extracted feature of the polarity of the received signals, wherein the extracted feature of the polarity of the received signals is caused by the signals having traveled different propagation paths to two different points on the traveled path.

12. The method of claim 11, wherein generating expected signal power levels of the received signals includes determining unobstructed direct electromagnetic wave propagation conditions from a transmitter to the traveled path and obstructed direct electromagnetic wave propagation conditions from a transmitter to the traveled path.

13. The method of claim 11 further comprising:
determining a bias region for the first estimated track;
selecting one or more LOPs, based on the bias region, to advance; and
determining the track bias based on the selected one or more selected LOPs.

14. The method of claim 13, further comprising:
determining a plurality of biases;
determining a final bias based on a sum of the plurality biases; and
determining the second estimated track based on the sum of the plurality of biases.

15. The method of claim 14, further comprising:
weighing one or more of the plurality of biases prior to summing the plurality of biases, or
weighing one or more of the plurality of biases based on an age of the one or more LOPs or on a distance of the one or more LOPs from an estimated current position.

16. The method of claim 3,
wherein receiving the signals along the traveled path includes receiving the signals at two different points along the traveled path at a same time,
wherein recording signal power levels of the received signals includes recording the signal power levels of the received signals over at the two different points, and
wherein the extracted feature is caused by the signals having traveled different propagation paths to the two different points on the traveled path.

17. The method of claim 16, further comprising:
identifying an expected feature based on the expected signal power levels;
determining a track bias based the extracted feature and the expected feature; and
generating the second estimated track based on the track bias.

18. A device comprising:
a receiver to receive signals along a traveled path from a transmitter, wherein the traveled path is a path actually traveled by the receiver;
a memory to record signal power levels of the received signals and a first estimated track, wherein the first estimated track includes an estimate of the traveled path;
a processor to:
identify an extracted feature of the signal power levels, wherein the extracted feature is caused by a propagation path between the transmitter and the receiver transitioning from a first propagation path to a second propagation path as a result of the receiver having traveled from a first point on the traveled path to a second point on the traveled path, wherein the first point is different than the second point;
generate expected signal power levels of the received signals based on the first estimated track of the traveled path; and
generate an updated estimated track of the traveled path based on the recorded signal power levels, a first estimated track of the traveled path, the expected signal power levels, and the extracted feature,
wherein the memory is configured to store the updated estimated track, wherein the updated estimated track is more accurate than the first estimated track relative to the traveled path.

19. The device of claim 18,
wherein the receiver is configured to receive the signals over a period of time,
wherein the memory records the signal power levels of the received signals over the period of time,
wherein the extracted feature is caused by the signals having traveled different propagation paths to the two different points on the traveled path at two different times, and
wherein the processor is configured to identify an expected feature based on the expected signal power levels, determine a track bias based the extracted feature and the expected feature, and generate the updated estimated track based on the track bias.

20. The device of claim 19, wherein the processor is further configured to
- identify extracted features of the signal power levels, wherein the extracted features are caused by the signals having traveled different propagation paths to the traveled path;
- identify expected features based on the expected signal power levels, wherein determining the track bias includes determining the track bias based the extracted features and the expected features; and
- generate the updated estimated track based on the track bias, wherein each of the extracted features is caused by the signals having traveled different propagation paths from a same transmitter to the receiver.

* * * * *